US011206354B2

(12) United States Patent
Matsumoto

(10) Patent No.: US 11,206,354 B2
(45) Date of Patent: Dec. 21, 2021

(54) ELECTRONIC DEVICE AND METHOD OF CONTROLLING SAME

(71) Applicant: CANON KABUSHIKI KAISHA, Tokyo (JP)

(72) Inventor: Satoru Matsumoto, Hachioji (JP)

(73) Assignee: Canon Kabushiki Kaisha, Tokyo (JP)

( * ) Notice: Subject to any disclaimer, the term of this patent is extended or adjusted under 35 U.S.C. 154(b) by 159 days.

(21) Appl. No.: 16/445,252

(22) Filed: Jun. 19, 2019

(65) Prior Publication Data

US 2019/0394409 A1 Dec. 26, 2019

(30) Foreign Application Priority Data

Jun. 21, 2018 (JP) .............................. JP2018-118193

(51) Int. Cl.
| | | |
|---|---|---|
| H04N 5/232 | (2006.01) | |
| H04N 5/225 | (2006.01) | |
| G03B 13/16 | (2021.01) | |
| G03B 13/30 | (2021.01) | |
| G03B 13/34 | (2021.01) | |
| G02B 7/04 | (2021.01) | |

(52) U.S. Cl.
CPC ......... H04N 5/232945 (2018.08); G02B 7/04 (2013.01); G03B 13/16 (2013.01); G03B 13/30 (2013.01); G03B 13/34 (2013.01); H04N 5/2254 (2013.01); H04N 5/23212 (2013.01); H04N 5/23216 (2013.01); H04N 5/232935 (2018.08)

(58) Field of Classification Search
CPC .......... G02B 7/28–40; G02B 7/04–105; G03B 3/00–12; G03B 13/18–36; H04N 5/23212

USPC ............... 359/696, 698; 396/79–83, 89–152; 348/345–357
See application file for complete search history.

(56) References Cited

U.S. PATENT DOCUMENTS

| 7,403,705 B2 | 7/2008 | Onozawa |
| 8,350,945 B2 | 1/2013 | Yumiki |
| 9,888,182 B2 | 2/2018 | Sawa |
| 2006/0029381 A1 | 2/2006 | Onozawa |

(Continued)

FOREIGN PATENT DOCUMENTS

| CN | 1926852 A | 3/2007 |
| CN | 100539644 C | 9/2009 |

(Continued)

OTHER PUBLICATIONS

Office Action dated Sep. 3, 2020, in Chinese Patent Application No. 201910531874.2.

(Continued)

*Primary Examiner* — Xi Wang
(74) *Attorney, Agent, or Firm* — Venable LLP

(57) ABSTRACT

An electronic device comprises an adjustment unit for adjusting a focus distance of a lens unit and obtainment unit for obtaining, from the lens unit, first information relating to a first range and second information relating to a second range. The first range being a focus range of the lens unit, and the second range being a focus range, in the first range, in which adjustment by the adjustment unit is limited. The electronic device controls, on the basis of the first information and the second information, the display device so as to display the first range and the second range to be distinguishable from each other.

14 Claims, 13 Drawing Sheets

(56) References Cited

U.S. PATENT DOCUMENTS

| | | | |
|---|---|---|---|
| 2011/0103789 A1 | 5/2011 | Honjo et al. | |
| 2014/0267869 A1 | 9/2014 | Sawa | |
| 2017/0099428 A1* | 4/2017 | Okuyama | ................ G03B 3/10 |

FOREIGN PATENT DOCUMENTS

| | | |
|---|---|---|
| CN | 103702029 A | 4/2014 |
| CN | 104052925 A | 9/2014 |
| CN | 104184947 A | 12/2014 |
| EP | 1555558 A1 | 7/2005 |
| JP | H09-322046 A | 12/1997 |
| JP | 2006-047602 A | 2/2006 |
| JP | 2010-093422 A | 4/2010 |
| JP | 2012-177929 A | 9/2012 |
| JP | 2015-064523 A | 4/2015 |

OTHER PUBLICATIONS

Search Report dated Oct. 25, 2019, in European Patent Application No. 19179878.4.
U.S. Appl. No. 16/445,253 (first named inventor: Satoru Matsumoto).

\* cited by examiner

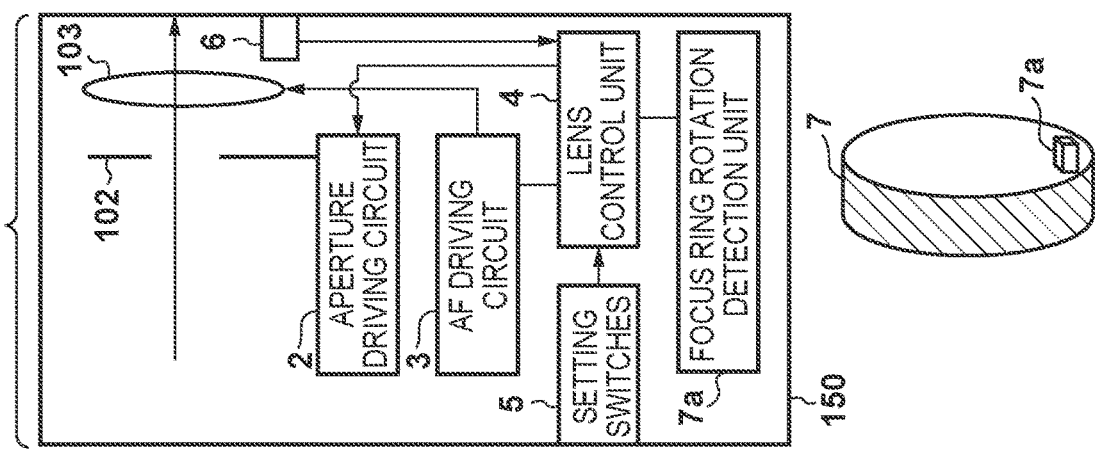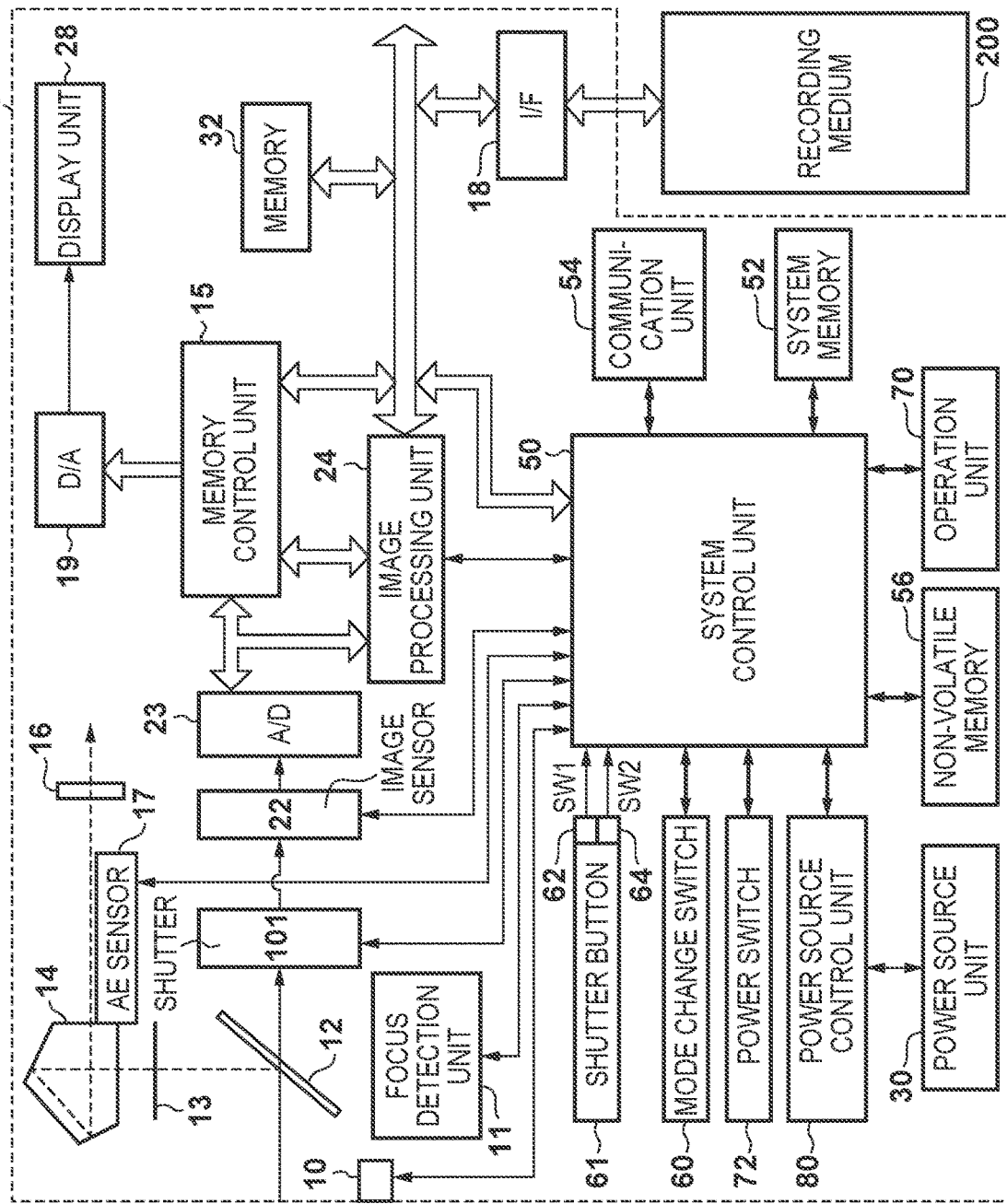

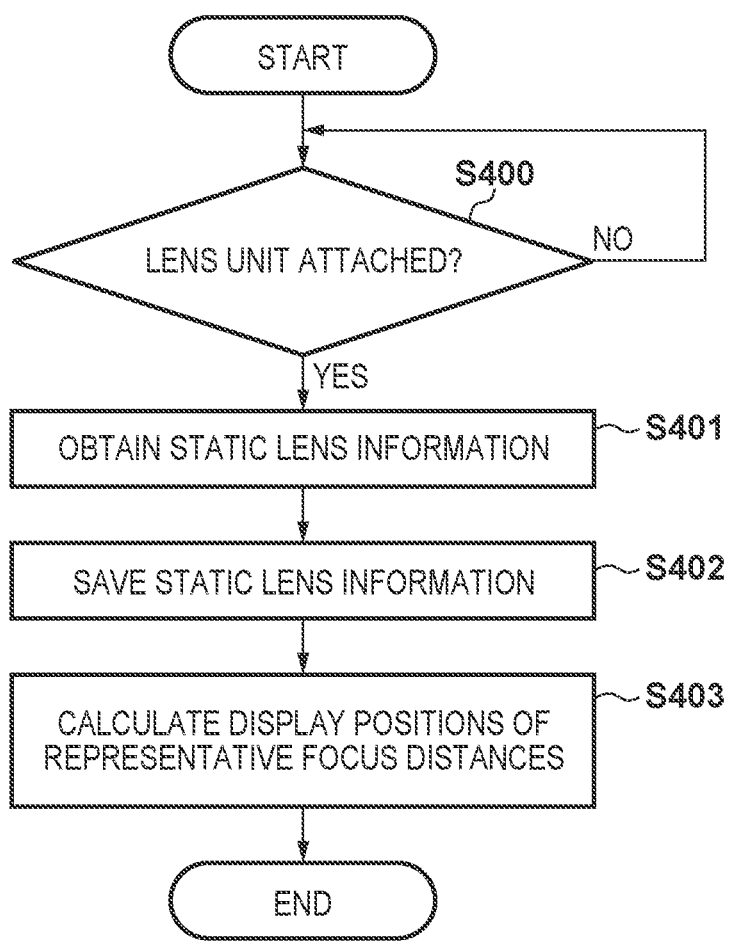

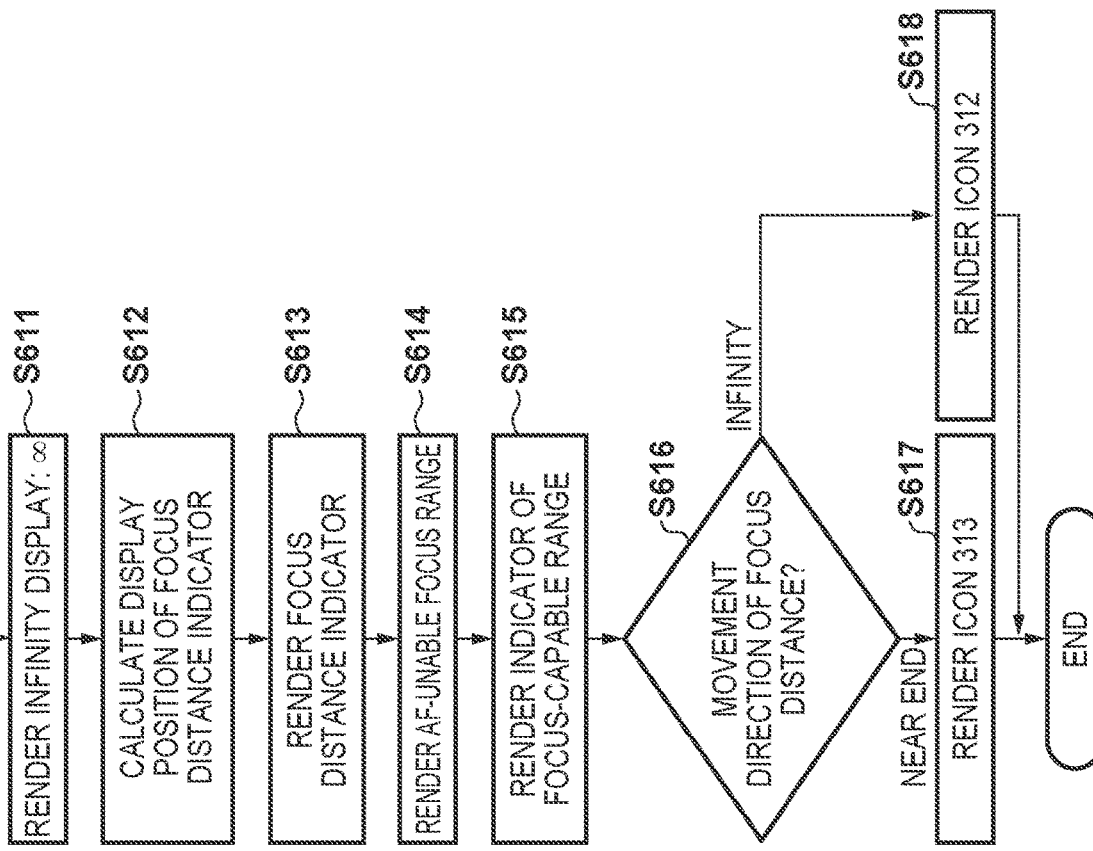
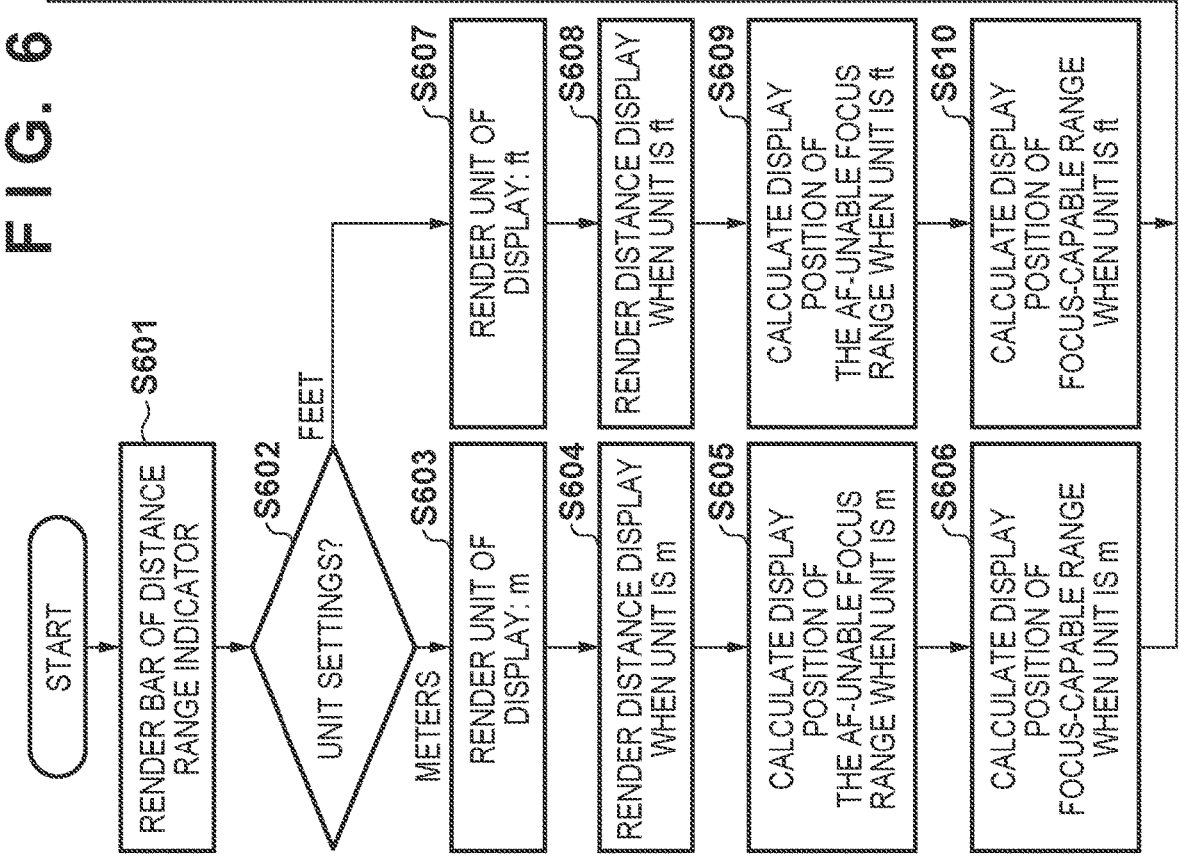
FIG. 6

ELECTRONIC DEVICE AND METHOD OF CONTROLLING SAME

BACKGROUND OF THE INVENTION

Field of the Invention

The present invention generally relates to an electronic device and a method of controlling the same. The present invention particularly relates to a function to assist image capturing.

Description of the Related Art

Modern image capturing apparatuses have autofocus functions. However, the intended subject or distance will not necessarily always be in focus. Depending on the subject or shooting environment, it can also be difficult to confirm the subject currently in focus from an image displayed in an electronic viewfinder (EVF). Furthermore, manual focus is sometimes used when making fine adjustments to the focus distance of a lens unit. For these reasons, image capturing apparatuses having functions for assisting in focusing have been proposed. For example, Japanese Patent Laid-Open No. 2010-93422 discloses an image capturing apparatus in which distance information of a subject, information about the current focus distance or depth of field, and the like is superimposed on images displayed in an EVF and provided to the user.

However, the technique according to Japanese Patent Laid-Open No. 2010-93422 does not disclose providing the user with information including the properties, settings, and so on of the lens unit which relates to focusing. For example, the focus range that can be used is sometimes limited in telephoto lens units, macro lens units, and the like, depending on the lens unit settings. Until now, it has been necessary to visually confirm the state of setting switches provided in the lens unit to check the settings.

Additionally, a lens unit is focused at infinity at a position slightly before the position where the focus ring, used for manual focus, is rotated the maximum amount in the direction of infinity. However, the size of the gap between these positions differs from lens unit to lens unit. If the lens unit is a focus-by-wire lens unit, the rotation amount of the focus ring is not restricted. A typical manual focus UI displays a mark indicating infinity at a fixed position, regardless of the position of infinity for that lens unit, and it has therefore been difficult to adjust the focus distance of a lens unit to infinity using the focus ring.

SUMMARY OF THE INVENTION

Having been achieved in light of such problems with the past techniques, an aspect of the present invention provides an electronic device capable of appropriately assisting focus adjustment operations made by a user in accordance with the properties of a lens unit, and a method of controlling such an electronic device.

According to an aspect of the present invention, there is provided an electronic device comprising: at least one processor and/or at least one circuit to perform the operations of the following units: an adjustment unit configured to adjust a focus distance of a lens unit; a control unit configured to control a display device; and an obtainment unit configured to obtain, from the lens unit, first information relating to a first range being a focus range of the lens unit and second information relating to a second range being a part of the focus range, the second range in which adjustment by the adjustment unit is limited, wherein the control unit controls, on the basis of the first information and the second information, the display device so as to display the first range and the second range to be distinguishable from each other.

According to another aspect of the present invention, there is provided a method of controlling an electronic device, the method comprising: adjusting a focus distance of a lens unit; obtaining, from the lens unit, first information relating to a first range being a focus range of the lens unit and second information relating to a second range being a part of the focus range, the second range in which adjustment in the adjusting is limited; and controlling, on the basis of the first information and the second information, a display device so as to display the first range and the second range to be distinguishable from each other.

According to a further aspect of the present invention, there is provided a non-transitory computer-readable medium that stores one or more programs including instructions executable by one or more processors in an electronic device, wherein the instructions, when executed by the one or more processors, causes the electronic device to perform a method comprising: adjusting a focus distance of a lens unit; obtaining, from the lens unit, first information relating to a first range being a focus range of the lens unit and second information relating to a second range being a part of the focus range, the second range in which adjustment in the adjusting is limited; and controlling, on the basis of the first information and the second information, a display device so as to display the first range and the second range to be distinguishable from each other.

According to another aspect of the present invention, there is provided an electronic device attachable to an image capture apparatus, comprising: a lens whose focus distance is adjustable; and at least one processor and/or at least one circuit to perform the operations of the following units: a communication unit configured to communicate with the image capturing apparatus; and a control unit configured to control the communication unit so as to send, to the image capturing apparatus, first information relating to a first range being a focus range of the lens unit and second information relating to a second range being a part of the focus range.

Further features of the present invention will become apparent from the following description of exemplary embodiments with reference to the attached drawings.

BRIEF DESCRIPTION OF THE DRAWINGS

FIGS. 2A and 2B are block diagrams illustrating an example of the functional configuration of a digital camera system according to embodiments.

FIG. 4 is a flowchart relating to operations by a system control unit 50 according to the first embodiment.

FIG. 6 is a flowchart relating to operations by the system control unit 50 according to the first embodiment.

DESCRIPTION OF THE EMBODIMENTS

An exemplary embodiment of the present invention will now be described in detail in accordance with the accompanying drawings. The following describes embodiments in which the present invention is applied in an interchangeable lens-type digital camera system, which serves as an example of an electronic device according to the present invention. However, the present invention can be broadly applied in interchangeable lens-type image capturing systems, such as an interchangeable lens-type digital video camera system. Additionally, the user interface (UI) described in the embodiments can be displayed not only in a display unit of the image capturing system, but also in a display unit of an electronic device capable of communicating with the image capturing system. Accordingly, the present invention can also be applied in an electronic device capable of communicating with an interchangeable lens-type image capturing system. This electronic device may be a personal computer, a tablet terminal, a smartphone, a game console, a media player, or the like, but is not limited thereto.

Figure 1A:
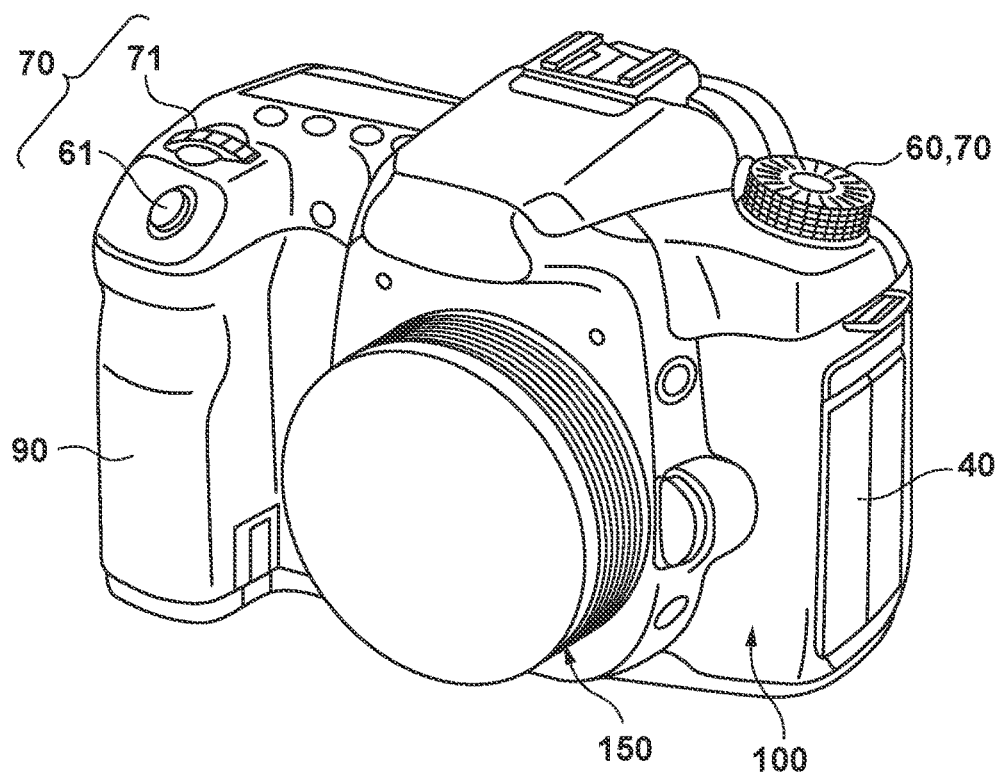
FIGS. 1A and 1B are diagrams illustrating an example of the external appearance of a digital camera system serving as an example of an electronic device according to embodiments.
Figure 1B:
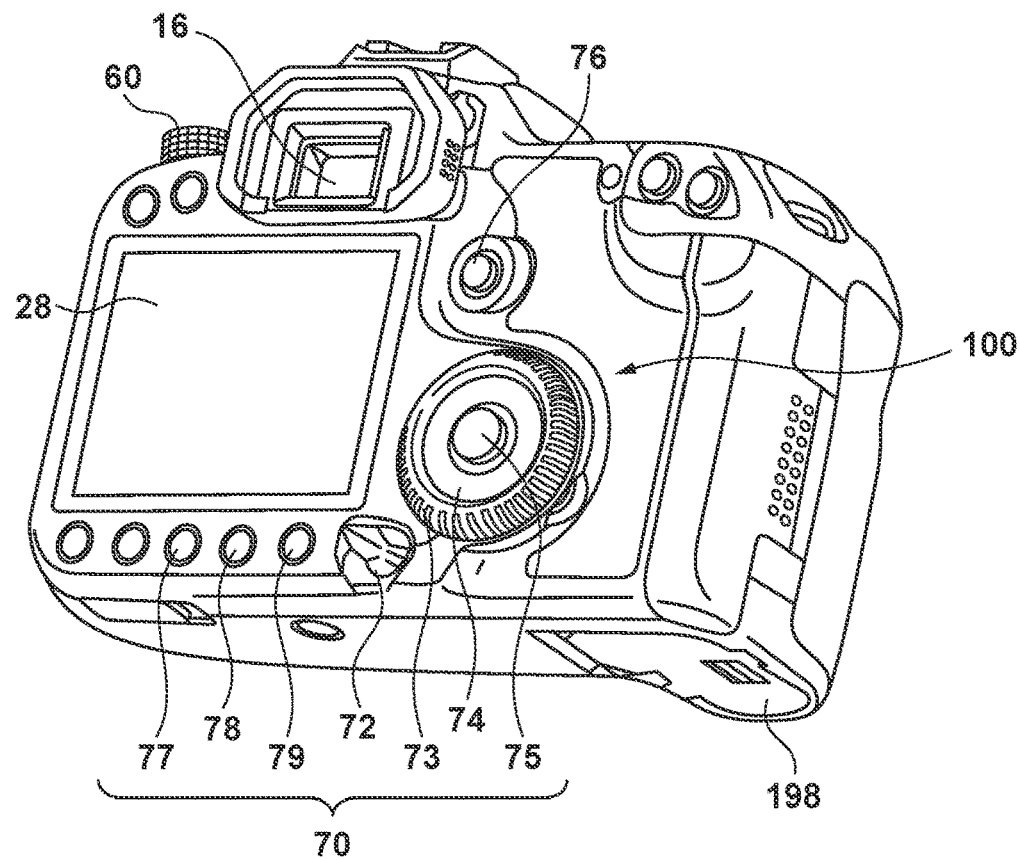

FIGS. 1A and 1B illustrate the external appearance of an interchangeable lens-type single-lens reflex digital camera system (called simply a "camera system" hereinafter) serving as an example of an electronic device in which the present invention can be applied. FIG. 1A is a front perspective view of the camera system, and FIG. 1B is a rear perspective view of the camera system. The camera system includes a camera body 100 (called simply a "body 100" hereinafter) to and from which a lens unit 150 can be attached and removed, and the lens unit 150 which can be attached to and removed from the body 100.

A display unit 28 is a touch screen, for example, and displays images that have been shot, various types of information, a graphical user interface (GUI), and the like. A shutter button 61 supplies a shooting preparation instruction and a shooting start instruction to the body 100 in response to user operations. A mode switching dial 60 sets the body 100 to one of a plurality of modes that can be set, in response to a user operation. An openable/closeable terminal cover 40 protects connectors and the like for inserting connection cables for connecting the body 100 to external devices. A main electronic dial 71 supplies instructions for changing or setting settings values (shutter speed, aperture, and the like) to the body 100 in response to user operations. A power switch 72 supplies instructions for turning the body 100 on and off in response to user operations. A sub electronic dial 73 supplies instructions for moving a selection frame, cycling through images, and the like to the body 100 in response to user operations.

A directional key 74 is a key having up, down, left, and right parts that can be pressed, and supplies an instruction corresponding to a function assigned at the point in time when the key is pressed to the body 100. A set button 75 mainly supplies instructions for setting selected items to the body 100 in response to user operations. The combination of the directional key 74 and the set button 75 is used mainly for operations for selecting a desired item from among items in a menu screen displayed in the display unit 28, and operations for setting the selected item.

A live view (LV) button 76 supplies, to the body 100, an instruction for switching between activating and deactivating a live view display in the display unit 28, in response to user operations. During a moving image shooting mode, the LV button 76 also supplies instructions for starting and stopping moving image recording to the body 100, in response to user operations. An enlarge button 77 supplies, to the body 100, instructions for activating and deactivating enlargement of the live view display when in a shooting mode, instructions for changing the magnification, and so on, in response to user operations. The enlarge button 77 also supplies, to the body 100, instructions for enlarging images displayed in the display unit 28 when in a playback mode, instructions for increasing the magnification, and so on. A reduce button 78 supplies, to the body 100, an instruction for reducing the magnification of the image displayed in the display unit 28 when in the playback mode, in response to a user operation.

A playback button 79 instructs the body 100 to switch between the shooting mode and the playback mode, in response to user operations. Pressing the playback button 79 when in the shooting mode transitions the body 100 to the playback mode, and causes the newest image among the images recorded in a recording medium to be displayed in the display unit 28.

A viewfinder 16 is disposed within the body 100, and is an optical viewfinder for observing a focusing screen having an image forming surface on which the lens unit 150 forms an optical image of a subject. A cover 198 protects, for example, slots for storing the recording medium, which is a semiconductor memory card, and a secondary battery. A grip part 90 is a support part having a shape that makes it easy for the user to hold the body 100.

FIGS. 2A and 2B are block diagrams illustrating an example of the internal configuration of the camera system, where FIG. 2A illustrates the body 100, and FIG. 2B illustrates the lens unit 150. In FIGS. 2A and 2B, constituent elements illustrated in FIGS. 1A and 1B are given the same reference numerals.

The body 100 and the lens unit 150 are electrically connected to each other by a communication terminal 10 provided in the body 100 and a communication terminal 6 provided in the lens unit 150 coming into contact with each other. The body 100 and the lens unit 150 are capable of bidirectional communication through the communication terminals 10 and 6.

An AE sensor 17 supplies, to a system control unit 50, an output based on the brightness of the subject formed by the lens unit 150 on a focusing screen 13 via a quick-return mirror 12.

A focus detection unit 11 (AF sensor) pupil-divides a subject image, which is incident through the quick-return mirror 12 (called simply the "mirror 12" hereinafter), to generate a pair of image signals. The focus detection unit 11 finds a defocus amount and direction of the lens unit 150 on the basis of a phase difference between the generated image signals, and supplies the defocus amount and direction to the system control unit 50. The system control unit 50 drives a focus lens within the lens unit 150 on the basis of the defocus amount in order to implement an automatic focus detection (AF) process for adjusting the focus distance of the lens unit 150.

The mirror 12 is disposed in the position illustrated in the drawings while a viewfinder 16 is in use, and reflects incident light from the lens unit 150 toward the focusing screen 13. Part of the mirror 12 is formed as a half mirror. Light passing through the half mirror part is reflected by a sub mirror disposed at a rear surface of the mirror 12, and is then incident on the focus detection unit 11. When shooting an image, the mirror 12 retracts from the optical path so that the light entering from the lens unit 150 can be incident on an image sensor 22.

A pentaprism 14 reflects light so that the image formed on the focusing screen 13 can be observed through the viewfinder 16. By looking through the viewfinder 16, the user can confirm the current shooting range (visual field), the focus state of the subject, and so on.

A mechanical shutter 101 (called simply a "shutter 101" hereinafter) operates under the control of the system control unit 50, and adjusts an exposure time of the image sensor 22 when shooting a still image. When capturing a moving image, the shutter 101 is basically kept in a fully-open state.

The image sensor 22 is a CCD image sensor or a CMOS image sensor in which microlenses and photoelectric conversion units are arranged two-dimensionally. The optical image of the subject is converted into an electrical signal group (an analog image signal) by the individual photoelectric conversion units generating electrical signals having voltages based on incident light amounts. An A/D converter 23 converts the analog image signal output by the image sensor 22 into a digital image signal (image data). The A/D converter 23 may be built into the image sensor 22. The image data output by the A/D converter 23 is input to an image processing unit 24 or a memory control unit 15.

The memory control unit 15 stores the image data from the A/D converter 23 or the image processing unit 24 in memory 32. The memory control unit 15 reads out the image data stored in the memory 32 and outputs that image data to the image processing unit 24.

The image processing unit 24 subjects the image data output by the A/D converter 23 or the memory control unit 15 to image processing such as noise suppression, white balance adjustment, pixel interpolation (demosaicing), resizing, color conversion, tone correction, encoding, decoding, and the like. The image processing unit 24 may also subject the image data to processing such as the detection, recognition, and tracking of a region containing specific subject, such as a face or a person. The image processing unit 24 outputs the image data, to which the processing has been applied, to the memory control unit 15. Additionally, the image processing unit 24 can generate, from the image data, evaluation values used in automatic focus detection (AF), automatic exposure control (AE), and the like, and can supply those evaluation values to the system control unit 50. Using these evaluation values, the system control unit 50 can execute AF and/or AE processing.

The memory 32 is used mainly for storing image data. The memory 32 has capacity capable of storing a predetermined number of still images, a predetermined amount of time of moving images and audio data, and the like. The memory 32 is also used as video memory for the display unit 28.

The memory control unit 15 supplies image data for display, stored in the memory 32, to a D/A converter 19. The D/A converter 19 converts the image data into electrical signals suitable for the display unit 28, and supplies those signals to the display unit 28. Image data for display, written into the memory 32, is thus displayed by the display unit 28 in this manner. By shooting a moving image and immediately displaying that image in the display unit 28, the display unit 28 can be caused to function as an electronic viewfinder (EVF). The image displayed when the display unit 28 is caused to function as an EVF is called a "live view image".

Non-volatile memory 56 is memory that can be electrically rewritten by the system control unit 50, and is EEPROM memory, for example. The non-volatile memory 56 stores programs that can be executed by the system control unit 50, various types of settings values, GUI data, and the like.

The system control unit 50 includes at least one programmable processor, and controls the operations of the camera system as a whole by loading programs stored in the non-volatile memory 56 into system memory 52 and executing those programs. The system memory 52 is used to store data necessary when the system control unit 50 executes the programs.

A first shutter switch 62 turns on and emits a first shutter switch signal SW1 when the shutter button 61 is depressed halfway. The system control unit 50 recognizes the first shutter switch signal SW1 as a still image shooting preparation instruction. Once the shooting preparation instruction is recognized, the system control unit 50 commences operations such as autofocus (AF) processing, automatic exposure (AE) processing, auto white balance (AWB) processing, flash pre-emission (EF) processing, and the like.

A second shutter switch 64 turns on and emits a second shutter switch signal SW2 when the shutter button 61 is fully depressed. The system control unit 50 recognizes the second shutter switch signal SW2 as a still image shooting instruction. Upon recognizing the shooting instruction, the system control unit 50 controls the mirror 12, an aperture stop, and the shutter 101 to expose the image sensor 22. Once the exposure time ends, the system control unit 50 reads out the analog image signal from the image sensor 22, and controls operations relating to the image processing by the image processing unit 24 and the writing of an image data file to a recording medium 200.

An operation unit 70 is a collection of operation members provided in the body 100. For example, the mode switching dial 60, the shutter button 61, the main electronic dial 71, the power switch 72, the sub electronic dial 73, the directional key 74, the set button 75, the LV button 76, and the playback button 79 are included in the operation unit 70. Note that GUI parts displayed in the display unit 28, the operations of a touch panel provided in the display unit 28, and combinations of operations of the directional key and the set button also constitute a part of the operation unit 70.

A power control unit 80 is constituted by a battery detection circuit, a DC-DC converter, switch circuits for switching the blocks through which power passes, and so on, and detects information relating to a power source unit 30. The information detected by the power control unit 80 includes, for example, whether or not an AC adapter is connected, whether or not a battery is attached, the type of the battery, the remaining battery power, and the like, but is not limited thereto. The power control unit 80 communicates the detection results to the system control unit 50. The power control unit 80 also controls the DC-DC converter on the basis of the detection results and instructions from the system control unit 50, and supplies a necessary voltage for a necessary period to the various units, including the recording medium 200.

The power source unit 30 is a primary battery such as an alkaline battery, a lithium battery, or the like, a secondary battery such as a NiCd battery, a NiMH battery, a Li battery, or the like, an AC adapter, and so on. A recording medium I/F 18 is an interface for the recording medium 200, which is a memory card, a hard disk, or the like. The recording medium 200 is a recording medium for recording shot images, such as a memory card or the like, and is constituted by semiconductor memory, a magnetic disk, or the like.

A communication unit 54 communicates with an external device connected wirelessly or by a physical cable. The communication unit 54 can also connect to a wireless LAN (local area network), the Internet, and so on. The communication unit 54 can send images captured by the image sensor 22 (including live view images), the same type of image data for display such as that displayed in the display unit 28, and so on to an external apparatus, receive image data, instruction data, and the like from an external device, and so on.

FIG. 2B is a diagram illustrating an example of the configuration of the lens unit 150. A focus ring 7 is attached so as to be capable of rotating along the outer circumference of the lens unit 150, which has a cylindrical shape. In the present embodiment, rotating the focus ring 7 does not move the focus lens mechanically. Rather, a focus-by-wire system is employed, in which the direction and amount of rotation of the focus ring 7 is detected, and the focus lens is driven by a motor. The user can adjust the focus manually by making a focus adjustment operation of rotating the focus ring 7.

Although FIG. 2B illustrates a fixed focal lens as an example of the lens unit 150, the lens unit 150 may be a zoom lens. Fixed focal lenses include wide-angle lenses, standard lenses, and telephoto lenses. Although the lens unit 150 normally has a plurality of lenses, including the focus lens, these are indicated as a single lens 103 in FIG. 2B. A lens control unit 4 is capable of bidirectional communication with the body 100 (the system control unit 50) via the communication terminal 6 and the communication terminal 10 provided in the body 100.

An aperture stop 102 is driven by an aperture control circuit 2, and is capable of adjusting an aperture value. The lens 103 includes a focus lens, which is driven by an AF driving circuit 3 and is capable of moving in an optical axis direction. The aperture control circuit 2 communicates information relating to the current aperture value of the aperture stop 102 to the lens control unit 4, and the AF driving circuit 3 communicates information relating to the current position of the focus lens to the lens control unit 4. Alternatively, the lens control unit 4 obtains this information from the aperture control circuit 2 and the AF driving circuit 3 periodically. A focus distance to the subject which the camera system is focusing on can be adjusted by controlling the position of the focus lens.

The lens control unit 4 includes one or more programmable processors, ROM that stores programs, settings values, information unique to the lens unit 150 (static lens information), and the like, and system memory used when executing programs. The static lens information includes a focus range that is a range of distance within which shooting is possible, information relating to one or more representative focus distances (shooting distances) and display positions thereof, and the like. The focus range that is a range of distance within which shooting is possible, which is included in the static lens information, corresponds to the overall range of motion of the focus lens. As will be described later, a shooting capable range in autofocus control can be limited through camera-side settings. The lens control unit 4 controls the overall operations of the lens unit 150 by the programmable processor loading programs from the ROM into the system memory and executing those programs. The system memory is used to temporarily store information of the lens unit 150 which changes in accordance with settings, operations, and the like (dynamic lens information). The position of the focus lens, the aperture value, the operation mode, and the like can be given as examples of the dynamic lens information.

Furthermore, the lens control unit 4 sends information of the lens unit 150 to the system control unit 50, controls the operations of the various units including the aperture control circuit 2 and the AF driving circuit 3, and so on in response to requests, instructions, and the like received from the system control unit 50 through the communication terminal 6. For example, the lens control unit 4 controls the aperture control circuit 2 and the AF driving circuit 3 on the basis of driving amounts, driving directions, and the like of the aperture stop 102 and the focus lens, received from the system control unit 50 through the communication terminal 6. In other words, it can be said that the system control unit 50 adjusts the focus distance of the lens unit 150.

The amount and direction of the rotation of the focus ring 7 are detected by a rotation detection unit 7a including a rotary encoder or the like, and are then communicated to the lens control unit 4. When the operation of the focus ring 7 is activated, the lens control unit 4 controls the AF driving circuit 3 to move the focus lens by a direction and an amount based on the direction and amount of the rotation of the focus ring 7. Additionally, when the focus lens has moved in response to the focus ring 7 being operated, the lens control unit 4 updates the dynamic lens information with information relating to the position of the focus lens after the movement. Note that the information of the position of the focus lens can be a value (%) in an overall focus driving range of 1 to 100(%). Through this, the information of the position of the focus lens can be used directly as information of the display position of a focus distance indicator (described later).

Setting switches 5, provided as necessary, are used by the user for selecting or changing settings relating to the lens unit 150. The lens control unit 4 stores the states of the setting switches 5 in the system memory as the dynamic lens information, and changes the operations of the lens unit 150 in accordance with the states of the setting switches 5.

A focus mode switch, a focus range setting switch (a focus limiter switch), a macro mode switch, an image stabilization function switch, and the like can be given as representative examples of the setting switches 5. The focus mode switch sets the focus mode of the lens unit 150 to one of an autofocus (AF) mode, a manual focus (MF) mode, and a full-time manual mode (manual override mode). Note that the full-time manual mode is a mode in which the focus lens is driven through AF with the shutter button halfway depressed, after which the operation of the focus ring 7 is activated. Depending on the camera, the full-time manual mode may be included in the AF mode. The present embodiment assumes that the mode can be switched between the manual focus mode and the autofocus mode using the focus mode switch.

The focus limiter switch is primarily provided in telephoto lenses, and switches between whether to limit the range over which the focus lens is driven during AF (the focus range during AF) to a single predetermined range, or not to limit that range (i.e., using a full focus range). The speed of the AF can be improved by limiting the driving range of the focus lens. In other words, the focus range over which autofocus can be adjusted can be limited by switching the focus limiter switch.

The macro mode switch is a switch for changing the focus range during AF to a range suited to macro shooting. The present embodiment assumes that a non-macro mode (a normal mode) and a macro mode can be selected. If the lens unit 150 has the focus limiter switch and the macro mode switch, the focus range during AF can be changed using the focus limiter switch, the macro mode switch, and the like.

The image stabilization function switch sets an image stabilization function to active or inactive if the lens unit 150 has such an image stabilization function.

In the present embodiment, a UI display relating to the focus range changes dynamically in accordance with the lens unit 150 attached to the body 100. Here, it is assumed that the resolution of the display unit 28 has 900 horizontal pixels and 600 vertical pixels, and that pixel coordinates (x,y) of the display unit 28 are represented by an orthogonal coordinate system that takes the upper-left as the origin (1, 1) and the lower-right as (900, 600). A distance range indicator, which is a UI schematically expressing the focus range of the attached lens unit 150, has a bar having a size of 500 pixels in the horizontal direction, which displays a range of x coordinates from 201 to 700. The size of the bar in the vertical direction is 30 pixels, for example.

Figure 3:
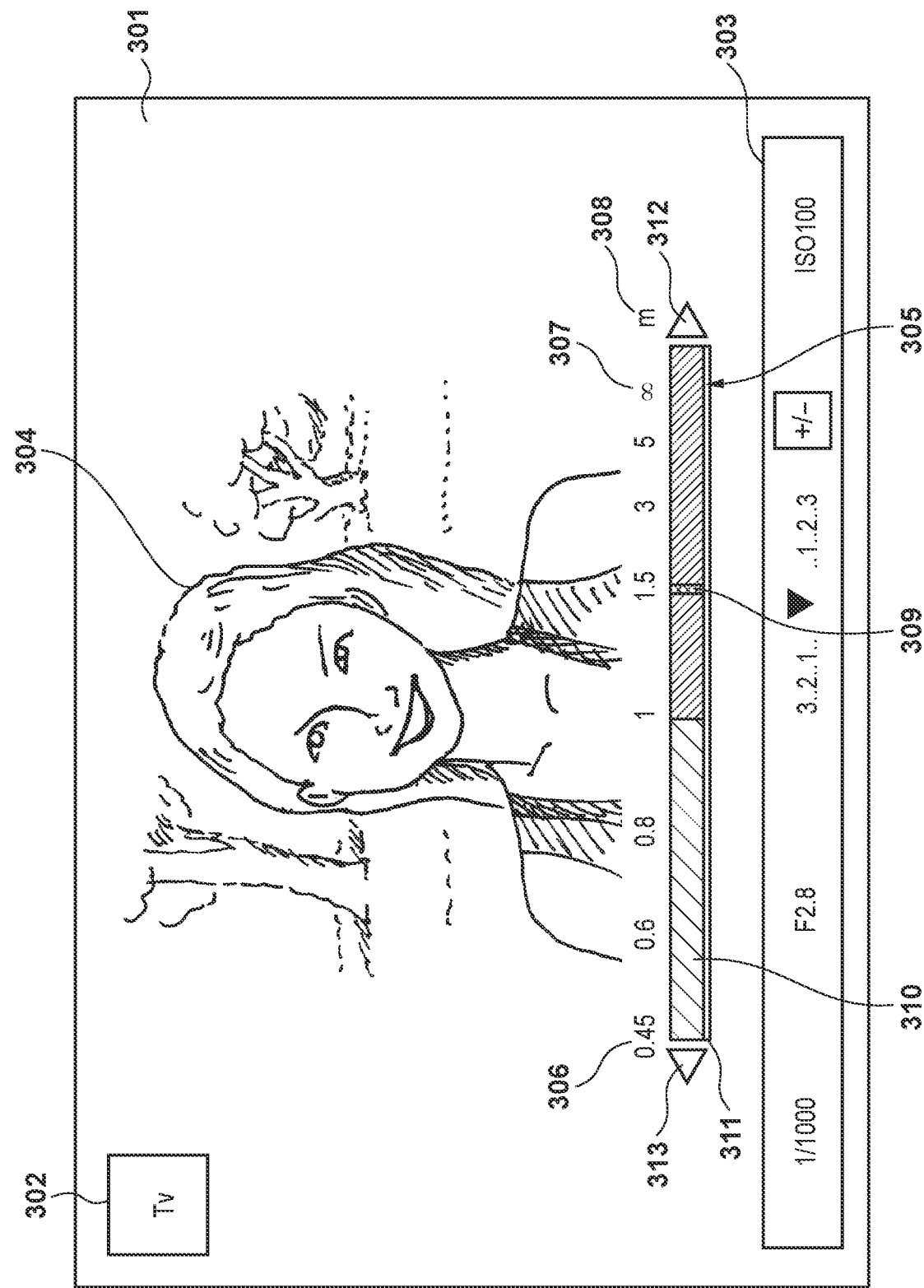
FIG. 3 is a diagram illustrating an example of the display of a distance range indicator according to a first embodiment.

FIG. 3 is a diagram schematically illustrating a specific example of the distance range indicator.

Here, the display unit 28 functions as an EVF, and a display screen 301 is displaying a live view image 304. The display items described below are displayed superimposed on the live view image 304, as a result of the system control unit 50 generating OSD image data and writing that data into the memory 32.

An icon 302 represents the shooting mode currently set in the body 100. Here, it is assumed that a shutter speed priority mode (Tv) is set.

Information relating to the shooting conditions that are currently set, such as the shutter speed, aperture value, exposure correction setting value, ISO sensitivity, and the like, is displayed in a shooting condition display region 303.

305 to 313 are elements constituting the distance range indicator according to the present embodiment.

A bar 305 of the distance range indicator has a rectangular shape longer in the horizontal direction, and in the present embodiment, has a size of 500 pixels in the horizontal direction. The bar 305 can indicate a relationship between the focus range in which the attached lens unit 150 can shoot (the range of motion of the focus lens; the focus range) and the position of the focus lens at which the lens unit 150 is focused at infinity. If the focus range in which the lens unit 150 is capable of autofocus is limited, the bar 305 can indicate a relationship between the focus range in which shooting is possible and the focus range in which autofocus is possible. A specific example will be given later.

A distance display 306 displays a plurality of representative distances, which are included in the focus range in which the attached lens unit 150 can shoot, near the top of the bar 305. The distance display 306 displays at least three distances, including the minimum distance (a closest distance) at which the lens unit 150 can shoot and infinity (∞). The distances included in the distance display 306, and the display coordinates of each distance with respect to the horizontal direction, are determined on the basis of the static lens information stored in the lens unit 150 and the size of the bar 305 of the distance range indicator with respect to the horizontal direction. Basically, the distances are displayed so that the left end of the bar 305 corresponds to the shortest distance at which shooting is possible (i.e., the shortest focus distance).

FIG. 3 illustrates an example of the distance display 306 when the focus range in which the attached lens unit 150 can shoot is 0.45 m to ∞. Here, 0.6, 0.8, 1, 1.5, 3, and 5 [m] are displayed in addition to a minimum distance of 0.45 and infinity ∞. Here, in the distance display 306, the display position of infinity 307 is located to the left of the right end of the bar 305. This indicates that the position of the telephoto end of the range of motion of the focus lens of the lens unit 150 does not correspond to the position at which the lens unit 150 is focused at infinity, and there is therefore skew between the two. The range of motion of the focus lens is the range between the near end and the telephoto end of the focus lens. When the lens unit 150 is uses a focus-by-wire system as in the present embodiment, a maximum rotation position of the focus ring 7 is a position corresponding to the telephoto end of the range of motion of the focus lens. The present specification will refer to the range of motion of the focus lens located further from the position where the lens unit 150 is focused at infinity as an "beyond infinity area". The beyond infinity area is a range between the position of the focus lens when the lens unit 150 is focused at infinity and the telephoto end of the range of motion of the focus lens. The size of the beyond infinity area is also stored in the lens unit 150 as the static lens information. In a state where the lens unit 150 is attached to a predetermined image capturing apparatus, it is assumed that the position of the focus lens focused at infinity is defined in advance as a position corresponding to infinity. In this case, when the lens unit 150 is attached to an image capturing apparatus having different optical system performance from the image capturing apparatus used when the lens unit 150 was designed, the focus lens may not be in focus at infinity even if the focus lens is moved to the position defined as corresponding to infinity. Additionally, the focus lens may not be in focus at infinity even if the focus lens is moved to the position defined as corresponding to infinity, due to the environment (temperature, humidity) in which the lens unit 150 is used, deterioration over time, and/or individual differences of the lens unit 150. The beyond infinity area is an area having redundancy, which is provided in advance in the range of motion of the focus lens, so that the user can correct deviation from this defined position.

A unit display 308 indicates the unit of the numerical values in the distance display 306. In the present embodiment, feet (ft) and meters (m) can be selected as the unit of the distance display. For example, when feet are selected as the unit of distance display by a user instruction made through the menu screen, the unit display 308 is "ft".

A focus distance indicator 309, which is displayed as a vertical line or a vertical rectangle within the bar 305, indicates the current focus distance of the lens unit 150. In FIG. 3, the focus distance indicator 309 is displayed directly below the display of "1.5 m" on the distance display 306, which indicates that the focus distance is approximately 1.5 m.

As described above, depending on the lens unit 150, the focus range in which a subject is searched for during AF (the focus range during AF) can be limited to one predetermined range. The focus range during AF is a focus range which an image capturing apparatus 1 can adjust through AF control. According to the present embodiment, when, in the lens unit 150, the focus range during AF is limited, the user is notified of an AF-unable focus range 310, using an inner pattern in the bar 305. Here, it is assumed that the focus range of the lens unit 150 during AF is limited to from 1 m to infinity. As such, the display format of the area of the bar 305 corresponding to the AF-unable focus range (the area of from the near end to 1 m) and the display format of the area corresponding to the focus range during AF (the area of from 1 m to infinity) are given visually different formats. In the example illustrated in FIG. 3, the AF-unable focus range 310 is displayed using a lighter color than the focus range during AF. Any desired method can be used as the method for making the focus range during AF set in the lens unit 150 and the AF-unable focus range visually different from each other, such as varying the color, pattern, brightness, or the like of the interior of the bar 305. Furthermore, another range indicator may be used instead of a display internal to the bar 305.

An indicator 311, which indicates at least a focus range corresponding to manual focus (a focus range in which focus is possible), is displayed separate from the bar 305. FIG. 3 illustrates an example in which the indicator 311 is displayed as a line or a rectangle longer in the horizontal direction, directly below the bar 305 and in a range corresponding to the focus range in which focus is possible. Accordingly, of the focus range indicated by the bar 305, the focus range in which both the AF-unable focus range 310 and the indicator 311 are displayed represents a focus range in which focus is possible only through MF. A focus range in which the AF-unable focus range 310 is displayed but the indicator 311 is not displayed represents a focus range in which focus is not possible, through both AF and MF.

The indicator 311 need not be in contact with the bar 305. Additionally, the indicator 311 may be displayed directly above the bar 305. In the example in FIG. 3, the AF-unable focus range 310 is displayed in a range of from 0.45 m to 1 m. On the other hand, the indicator 311 of the focus-capable range is displayed in a range of from 0.45 m to infinity. This therefore indicates that at present, in the focus range of from 0.45 m to 1 m, the lens unit 150 is capable of focusing only through MF, and in the focus range of from 1 m to infinity, the lens unit 150 is capable of focus through both MF and AF. The system control unit 50 obtains information relating to the state of the setting switches 5 in the lens unit 150, or the details of the current settings (e.g., the focus ranges in which AF and MF are possible or not possible), as the dynamic lens information. This makes it possible to control the display of the focus range 310, the indicator 311, and so on, as indicated not only in FIG. 3, but also in FIGS. 8 and 9, which will be described later.

Icons 312 and 313 represent indicators indicating the direction of movement in the focus distance of the lens unit 150 when the focus lens position is changed (i.e., whether the focus lens is moving toward or away from infinity). When the focus distance of the lens unit 150 is in moving toward infinity, the icon 312 is displayed, and the icon 313 is hidden. When the focus distance of the lens unit 150 is in moving away from infinity, the icon 313 is displayed, and the icon 312 is hidden. When the focus lens is positioned at an end of the range of motion, the method of displaying the icon 312 (313) is changed to communicate that operations of the focus ring 7 for moving the focus distance closer (further away) are disabled. By obtaining information relating to the current position of the focus lens periodically, for example, as the dynamic lens information, the system control unit 50 can control the display of the focus distance indicator 309, as well as the icons 312 and 313 indicating the movement direction of the focus distance.

FIG. 4 is a flowchart relating to processing executed by the system control unit 50 when the lens unit 150 is attached to the body 100. This processing is realized by the system control unit 50 loading a program recorded in the non-volatile memory 56 into the system memory 52 and executing the program. It is assumed that when the lens unit 150 is attached to the body 100, the body 100 detects the lens unit 150 having been attached, executes a predetermined connection sequence with the lens unit 150 (the lens control unit 4), and is thus capable of bidirectional communication through the communication terminals 6 and 10.

In step S400, the system control unit 50 detects whether or not the lens unit 150 is attached to the body 100.

If in step S400 it is detected that the lens unit 150 is attached to the body 100, in step S401, the system control unit 50 makes a request for the static lens information to the lens control unit 4. Upon receiving the request, the lens control unit 4 reads out the static lens information from the ROM and sends the information to the system control unit 50. Here, the static lens information may include information such as the product name of the lens unit 150, the serial number, the focus range in which shooting is possible (the focus range), a plurality of representative distances included in the focus range in which shooting is possible, the display positions of those distances, the ratio of the beyond infinity area to the range of motion of the focus lens, and the like. With respect to the focus range in which shooting is possible, the plurality of representative distances included in the focus range in which shooting is possible, and the display positions of those distances, information corresponding to the states or setting details of the setting switches 5 (e.g., normal mode, macro mode, and so on) is included. The information is not limited thereto, however. The plurality of representative distances includes at least the minimum distance at which shooting is possible (the closest distance). Infinity can be displayed using the beyond infinity area ratio, and therefore need not be included.

Although the unit of the distance information included in the static lens information is assumed to be [m], sets of distance information may be included for each of units. Here, the display positions of each of the plurality of representative distances included in the focus range in which shooting is possible may, for example, be relative positions when the overall range of motion of the focus lens is represented by 100. Here, although the lens unit 150 can be attached to multiple different models of camera bodies 100, the size of the display unit 28, the GUI specifications, and the like may differ depending on the camera body 100. As such, expressing the display position of the focus range in which shooting is or is not possible as relative positions with respect to the overall range of motion of the focus lens makes it possible to use the same information for a plurality of camera bodies 100.

In step S402, the system control unit 50 saves the obtained static lens information in the memory 32, and moves the process to step S403.

In step S403, the system control unit 50 calculates the display positions for each of the plurality of representative distances used in the distance display 306. It is assumed here that the display positions are the positions of the center coordinates, with respect to the horizontal direction, of individual distance displays having horizontal widths, such as "0.45" or "∞". For example, assume that the unit of the obtained distance is [m]. In this case, if a display position of 20 is associated with a distance of "0.8", the relative display position with respect to the bar 305 of the distance range indicator (the coordinate value with respect to the horizontal direction) is calculated as follows:

display position [pixel]=size [pixels] of bar 305 of
distance range indicator in horizontal direction×
20/100

In the present embodiment, the size of the bar 305 of the distance range indicator in the horizontal direction is 500 pixels, and thus the relative pixel coordinates of the display position are (100,y), and the image coordinates (300,y) of the display unit 28 are calculated as the display position. With respect to infinity, the display position may be calculated on the basis of the beyond infinity area ratio.

If the unit of the distance display is feet, the system control unit 50 first calculates the display positions for the individual distances, and then converts the individual distances into feet. Note that if the static lens information also includes sets of distance information in units of feet, the process for converting values in units of meters into values in units of feet can be omitted. Furthermore, if the static lens information includes macro mode information, display positions for the macro mode are also calculated.

The system control unit 50 saves the calculated display positions in the memory 32 and ends the process. Note that if the system control unit 50 has calculated values converted according to the unit of distance, those values are also saved in the memory 32.

Next, a process for displaying the distance range indicator will be described using the flowcharts in FIGS. 5A and 5B. This processing is realized by the system control unit 50 loading a program recorded in the non-volatile memory 56 into the system memory 52 and executing the program.

In step S501, the system control unit 50 determines whether or not an operation for ending the live view display (an operation of the LV button 76) has been detected. The process moves to step S518 if the operation has been detected, and to step S502 if the operation has not been detected.

In step S502, the system control unit 50 determines whether or not a distance range indicator hiding timer has timed out. The process moves to step S517 if the timer has timed out, and to step S503 if the timer has not timed out. The distance range indicator hiding timer will be described later.

In step S503, the system control unit 50 obtains the dynamic lens information from the lens unit 150, saves the information in the memory 32, and moves the process to step S504. The dynamic lens information may be information relating to the current focus lens position, the current aperture value, the state of the setting switches 5, the details of the current settings (whether or not the focus range during AF is limited, the focus range in which AF and MF are possible (or not possible), and so on), and the like. The information is not limited thereto, however. The focus range is defined by the distance of the near end and the distance of the infinity end, but as long as one end of the range is clearly the near end or the infinity end, it is sufficient to define only the distance of the other end. The distance information may be a concrete value in units of meters, or may be a relative value indicating a display position. If the information is a concrete value, units of meters may be used, or values for each unit may be prepared. The AF-unable focus range may be present at both the near end side and the infinity side.

In step S504, the system control unit 50 compares the dynamic lens information obtained in step S503 with the most recent dynamic lens information saved in step S508, and determines whether or not the details have changed. The system control unit 50 moves the process to step S505 if there is a change, and to step S513 if there is no change.

In step S505, the system control unit 50 refers to the non-volatile memory 56, for example, and confirms the distance information display settings. In the present embodiment, the display of the focus distance information (the distance range indicator) can be set from among a constant display during MF mode, a predetermined time display during focus distance adjustment, a constant display, or no display. The system control unit 50 moves the process to step S506 if the display setting is "constant display during MF", to step S509 if the display setting is "predetermined time display during focus distance adjustment", to step S512 if the display setting is "constant display", and to step S508 if the display setting is "no display".

In step S506, the system control unit 50 refers to the dynamic lens information obtained from the lens unit 150 in step S503, and determines whether or not the current focus mode of the lens unit 150 is the MF mode. The process moves to step S507 if the focus mode is the MF mode, and returns to step S501 if the focus mode is not the MF mode (if the focus mode is the AF mode).

In step S507, the system control unit 50 executes a process for rendering the distance range indicator. Details regarding this process will be given later. Once the rendering process has been executed, the system control unit 50 moves the process to step S508.

In step S508, the system control unit 50 updates the most recent dynamic lens information saved in step S508 with the dynamic lens information obtained in step S503, and returns the process to step S501. Note that unless the process has moved from step S507 to step S508, the dynamic lens information has not changed, and thus the process may return to step S501 without executing step S508.

In step S509, the system control unit 50 clears the distance range indicator hiding timer. The distance range indicator hiding timer is used to measure the time for which the distance range indicator is displayed, and may be a variable stored in the memory 32 or a hardware counter, for example.

In step S510, the system control unit 50 executes the distance range indicator rendering process in the same manner as in step S507, and moves the process to step S511.

In step S511, the system control unit 50 sets the distance range indicator hiding timer and starts the timer (starts a time measurement process) so that the distance range indicator is hidden after a predetermined amount of time. For example, the system control unit 50 stores, in the memory 32, the time from a clock in the body 100. Alternatively, the system control unit 50 sets a default value corresponding to a predetermined amount of time in a countdown timer and then starts a countdown process. The system control unit 50 then moves the process to step S508.

In step S512, the system control unit 50 executes the distance range indicator rendering process in the same manner as in steps S507 and S510, and moves the process to step S508.

In step S513, the system control unit 50 confirms the display settings in the same manner as in step S505. The system control unit 50 moves the process to step S508 if the display settings are "no display", and to step S514 if the display settings are other settings.

In step S514, the system control unit 50 determines the current position of the focus lens from the dynamic lens information obtained in step S503. The system control unit 50 moves the process to step S515 if the current position of the focus lens is at the near end, to step S516 if the current position of the focus lens is at the infinity end, and to step S508 if the current position of the focus lens is neither at the near end nor the infinity end.

In step S515, the system control unit 50 changes the color of the icon 313 to gray, and then moves the process to step S508. As a result, the user is notified that even if the focus ring 7 is rotated further toward the near end in the MF mode, the focus distance will not change, as will be described later using FIG. 10.

In step S516, the system control unit 50 changes the color of the icon 312 to gray, and then moves the process to step S508. As a result, the user is notified that even if the focus ring 7 is rotated further toward the far end in the MF mode, the focus distance will not change, as will be described later using FIG. 10. Although color of the icons 312 and 313 is changed to gray in steps S515 and S516, another display format may be used, such as flashing the icons, using a color that indicates a warning, such as red or yellow, or the like. If the focus ring 7 has a tactile feedback function, the focus ring 7 may provide tactile feedback instead of changing the display format of the icons 312 and 313, or along with changing the display format.

In step S517, the system control unit 50 hides the distance range indicator and then returns the process to step S501.

In step S518, the system control unit 50 clears the dynamic lens information saved in the memory 32 in step S508.

In step S519, the system control unit 50 clears the distance range indicator hiding timer in the same manner as in step S509.

In step S520, the system control unit 50 hides the distance range indicator and ends the process.

Figure 5A:
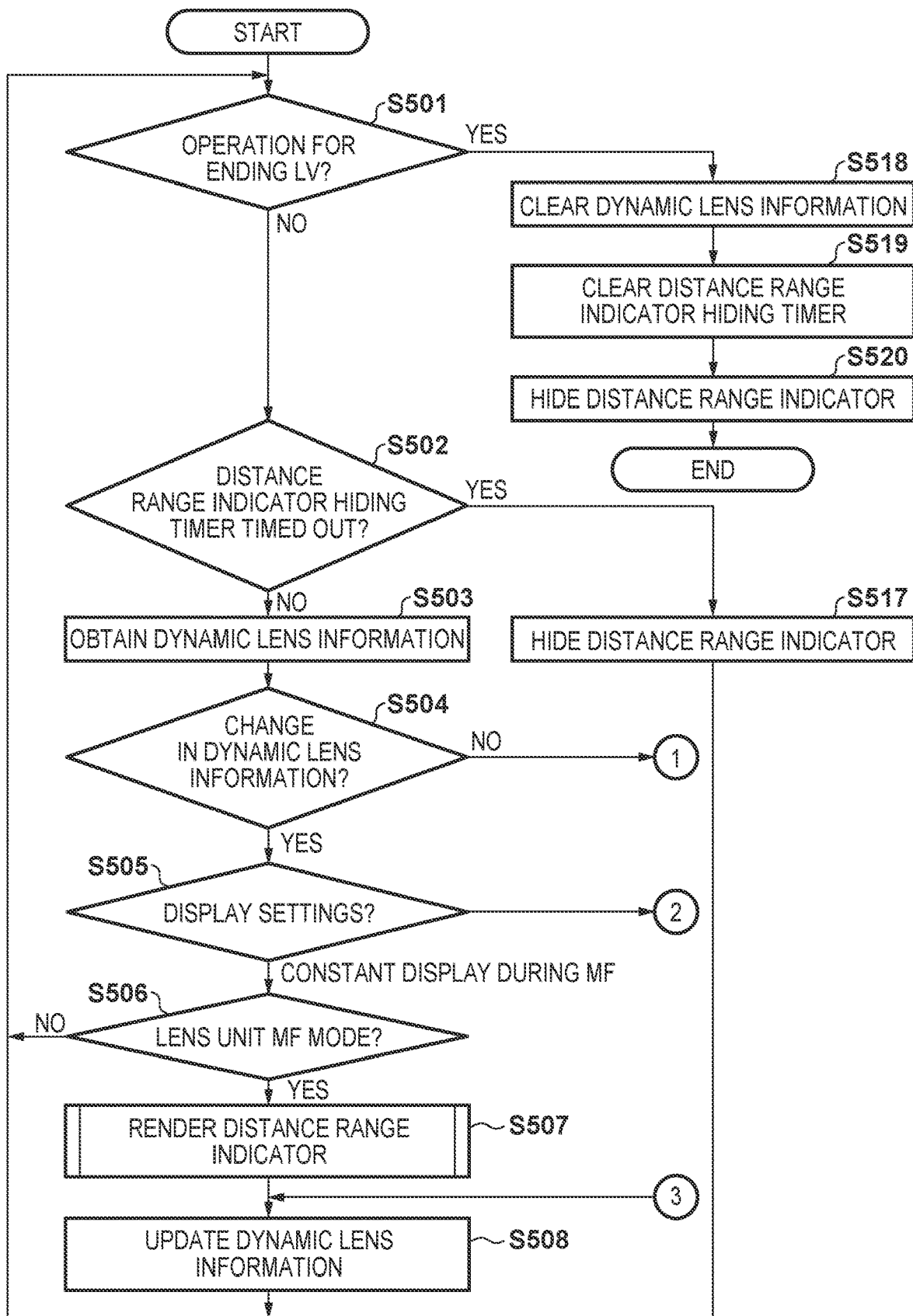
FIGS. 5A and 5B are flowcharts relating to operations by the system control unit 50 according to the first embodiment.
Figure 5B:
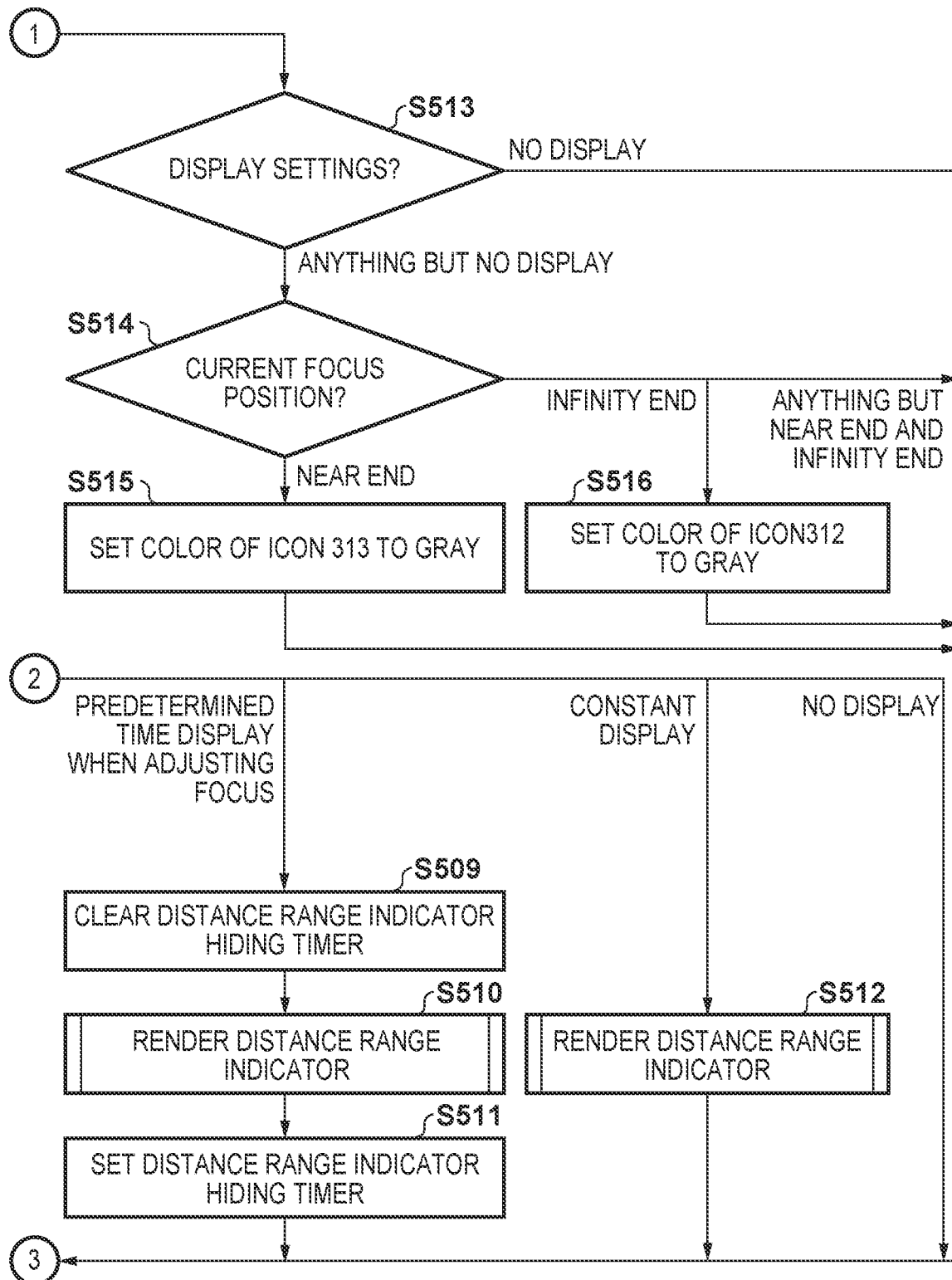

FIG. 6 is a flowchart relating to the details of the distance range indicator rendering process executed in steps S507, S510, and S512 of FIGS. 5A and 5B. This processing is realized by the system control unit 50 loading a program recorded in the non-volatile memory 56 into the system memory 52 and executing the program.

In step S601, the system control unit 50 renders the bar 305 of the distance range indicator. The "rendering" referred to below is an operation where image data to be rendered is written into an address corresponding to the display position, within a VRAM region of the memory 32. At this point in time, the bar 305 is rendered as a frame only, with nothing in its interior. Note that the font, size, and so on used to render the text are assumed to be set in advance.

In step S602, the system control unit 50 confirms the unit setting by referring to the non-volatile memory 56, for example, and moves the process to step S603 if the unit for distance display is "meters", and to step S607 if the unit is set to "feet".

In step S603, the system control unit 50 renders "m", indicating "meters", as the unit display 308.

In step S604, the system control unit 50 renders the distance display 306, with the unit as meters, in the position calculated in step S403. Note that the details of the distance display 306 may be varied in accordance with the state of or details of the settings in the setting switches 5 (e.g., whether or not the macro mode is set).

In step S605, the system control unit 50 calculates the display position of the AF-unable focus range 310 for the case where the unit is meters. For example, if the unit of the dynamic lens information is meters and the display position of the AF-unable focus range is from 0 to 40, and the total of 500 pixels of the distance range indicator corresponds to 100, 40% from the left end (200 pixels) correspond to the display position. Note that the AF-unable focus range may be present on the infinity side as well. Note also that if the starting point and the ending point of the display position are the same, the display is unnecessary, and the display position is therefore not calculated. Step S605 need not be executed when there is no AF-unable focus range.

In step S606, the system control unit 50 calculates the display position of the indicator 311 for the focus-capable range for the case where the unit is meters. For example, if the unit of the dynamic lens information is meters and the display position of the indicator 311 of the focus-capable range is from 0 to 90, and the total of 500 pixels of the distance range indicator corresponds to 100, 90% from the left end (450 pixels) correspond to the display position of the indicator 311. Note also that if the starting point and the ending point of the display position are the same, the display is unnecessary, and the display position is therefore not calculated.

In step S607 to S610, the system control unit 50 carries out the same operations as those in steps S603 to S606, aside from the unit of the distance display being feet. Accordingly, descriptions thereof will be omitted. If only values in units of meters are included as the static lens information and/or the dynamic lens information, the system control unit 50 converts the values in units of meters to values of units in feet before rendering the distance display 306 in step S608.

In step S611, the system control unit 50 renders the display of infinity 307. Note that if infinity 307 has already been rendered as part of the distance display 306 in step S604 or step S608, step S611 need not be executed.

In step S612, the system control unit 50 calculates the display position of the focus distance indicator 309. If, in the dynamic lens information, the current focus lens position is 60%, the display position of the focus distance indicator 309 is a position 300 pixels from the left of the total of 500 pixels in the distance range indicator, and thus the X coordinate of the display position in the display unit 28 is 500 [pixels].

In step S613, the system control unit 50 renders the focus distance indicator 309 on the basis of the display position calculated in step S612.

In step S614, the system control unit 50 renders the AF-unable focus range 310 within the bar 305 on the basis of the display position calculated in step S605 or step S609. Step S614 is not executed when there is no AF-unable focus range.

In step S615, the system control unit 50 renders the indicator 311 of the focus range in which focus is possible, on the basis of the display position calculated in step S606 or step S610.

In step S616, the system control unit 50 determines the movement direction of the focus distance of the lens unit 150, on the basis of the position information of the focus lens included in the most recent dynamic lens information saved in step S508, and the current information of the focus lens included in the dynamic lens information obtained in step S503. The system control unit 50 moves the process to step S617 if the focus distance is moving toward the near end, and to step S618 if the focus distance is moving toward infinity.

In step S617, the system control unit 50 renders the icon 313, which indicates that the focus distance of the lens unit 150 is moving toward the near end, and then ends the process.

In step S618, the system control unit 50 renders the icon 312, which indicates that the focus distance of the lens unit 150 is moving toward infinity, and then ends the process.

The display format of the icons 312 and 313 in steps S617 and S618 may be different from the display format of the icons 312 and 313 in steps S515 and S516. For example, the icons may be rendered as white or green.

Figure 7:
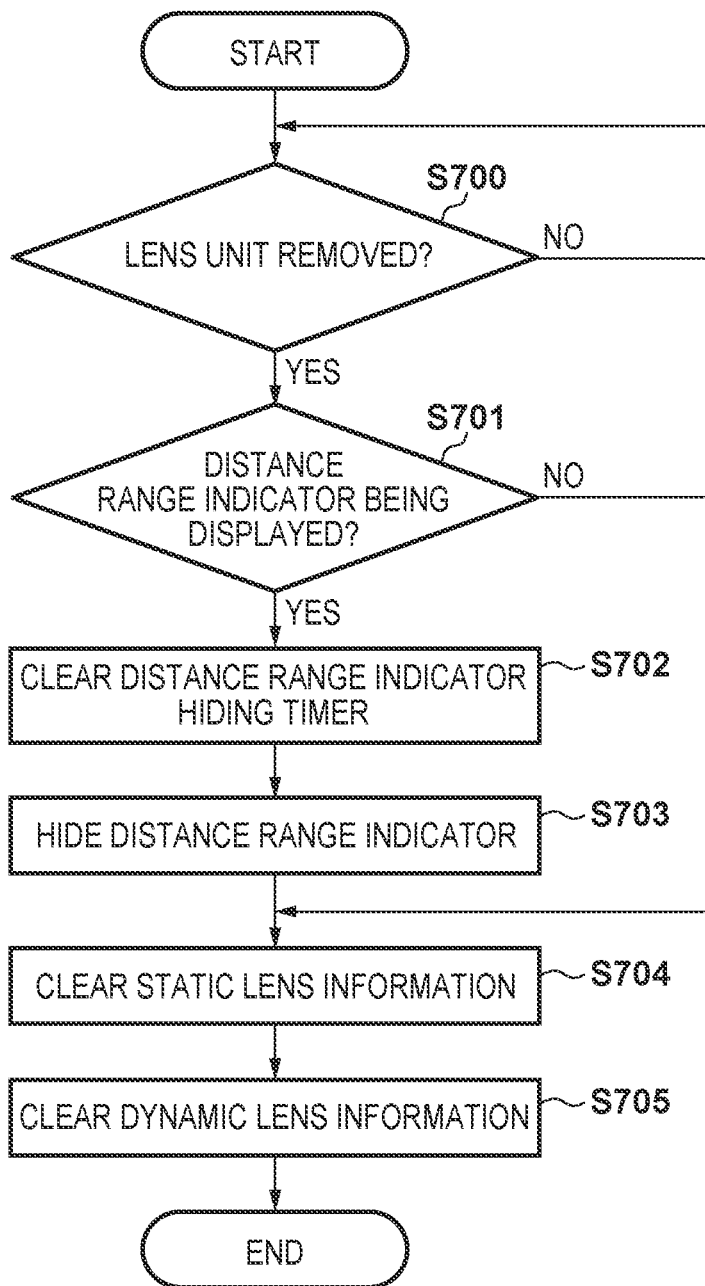
FIG. 7 is a flowchart relating to operations by the system control unit 50 according to the first embodiment.

FIG. 7 is a flowchart relating to processing executed by the system control unit 50 when the lens unit 150 is removed from the body 100. This processing is realized by the system control unit 50 loading a program recorded in the non-volatile memory 56 into the system memory 52 and executing the program.

In step S701, the system control unit 50 determines whether or not the distance range indicator is currently being displayed. The system control unit 50 moves the process to step S702 if the distance range indicator is currently being displayed, and to step S704 if the distance range indicator is not currently being displayed.

In step S702, the system control unit 50 clears the distance range indicator hiding timer in the same manner as in step S519.

In step S703, the system control unit 50 clears the distance range indicator in the same manner as in step S520.

In step S704, the system control unit 50 clears the static lens information saved in the memory 32.

In step S705, the system control unit 50 clears the dynamic lens information saved in the memory 32 and ends the process. Note that sequences such as a sequence for cutting the communication connection between the lens control unit 4 and the system control unit 50 are also executed, but descriptions thereof will not be given here. In this manner, the distance range indicator is hidden if the lens unit 150 is removed from the body 100 while the distance range indicator is being displayed.

Figure 8:
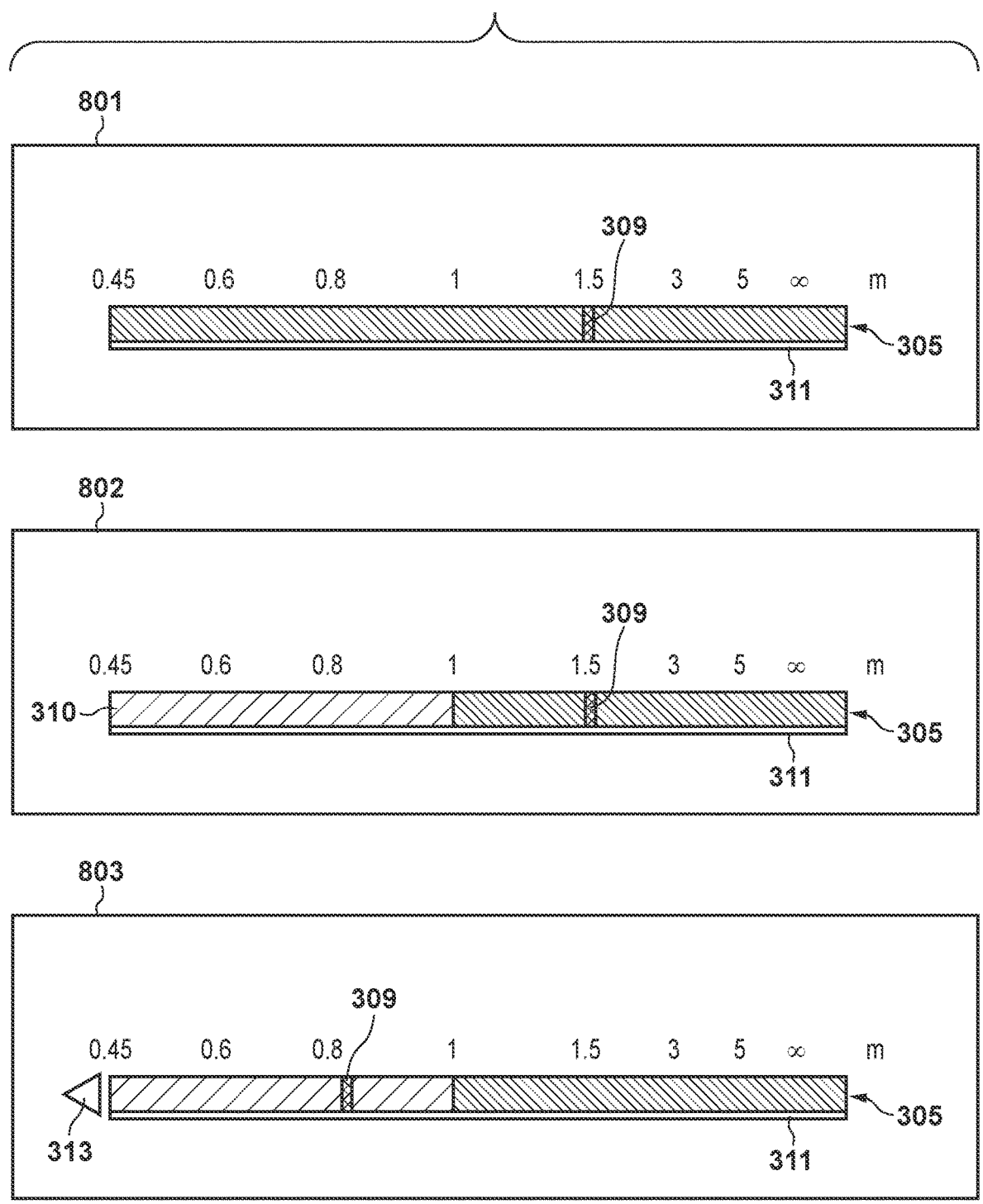
FIG. 8 is a diagram illustrating an example of the display of a distance range indicator when a lens unit includes a focus limiter switch, according to a first embodiment.

FIG. 8 illustrates an example of the display of the distance range indicator when the lens unit 150 includes a focus limiter switch in the setting switches 5. Here, it is assumed that if the state is one in which the focus limiter switch is off (there is no limit on the focus range during AF, which is equivalent to the focus range of the lens unit 150), the focus range during AF is from 0.45 m to infinity. On the other hand, it is assumed that if the state is one in which the focus limiter switch is on (there is a limit on the focus range during AF), the focus range during AF is limited to from 1 m to infinity. In other words, if the focus limiter switch is on, a range of from 0.45 m to 1 m is an AF-unable focus range. Control is carried out to display the AF-unable focus range, in a format different from the focus range during AF, within the bar 305, in order to communicate that there is a distance at which AF is not possible.

801 indicates the distance range indicator when the focus limiter switch is off. The distance range indicator indicates that the focus range in which focus is possible is from 0.45 m to infinity for both MF and AF.

802 indicates the distance range indicator when the focus limiter switch is on, and the AF-unable focus range 310 is rendered within the bar 305. The AF-unable focus range is from 0.45 m to 1 m, and the focus range during AF is from 1 m to infinity. On the other hand, the indicator 311 indicates that the focus range in which focus is possible with MF operations is from 0.45 m to infinity.

803 is an example of the display of the distance range indicator when the focus limiter switch is on and the focus distance is being moved toward the near end through MF operations. The focus lens can also be moved in the AF-unable focus range through MF operations. Accordingly, 803 indicates the focus distance indicator 309 in the AF-unable focus range 310. Additionally, the icon 313, which indicates that the focus distance is moving toward the near end, is displayed as well.

Figure 9:
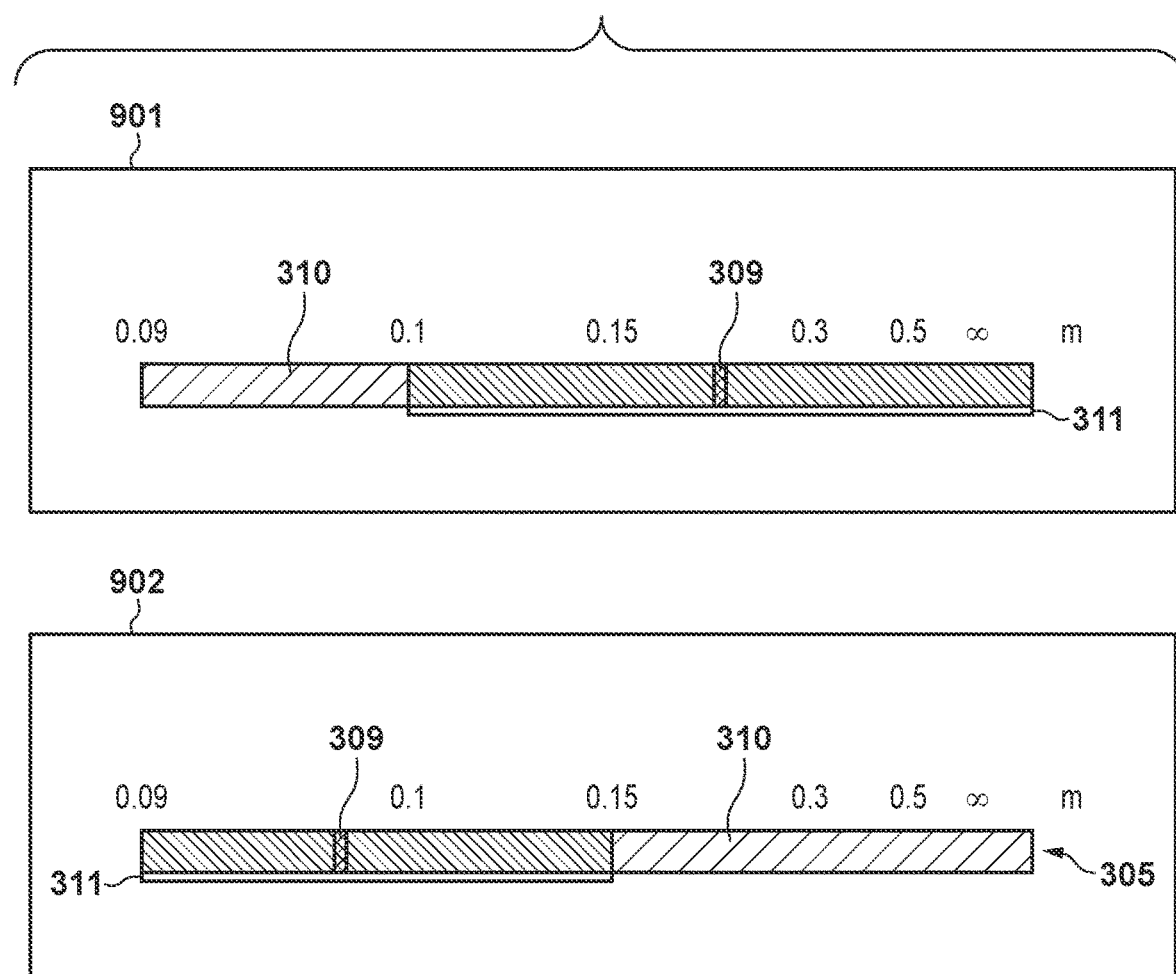
FIG. 9 is a diagram illustrating an example of the display of a distance range indicator when a lens unit has a macro mode, according to the first embodiment.

FIG. 9 illustrates an example of the display of the distance range indicator when the lens unit 150 includes a macro mode switch in the setting switches 5. Here, it is assumed that in a state where the macro mode switch is off (normal mode), the focus range in which focus is possible is from 0.1 m to infinity, and that in a state where the macro mode switch is on (macro mode), the focus range in which focus is possible is from 0.09 m to 0.15 m.

901 is an example of the display of the distance range indicator in the normal mode. The indicator 311 of the focus-capable range is displayed from 0.1 m to the telephoto end (the right end of the bar 305). Meanwhile, the AF-unable focus range 310 is displayed from 0.09 m to 0.1 m. In this case, focus is possible through both AF and MF in the focus range from 0.1 m to infinity, but focus is possible through neither AF nor MF in the focus range from 0.09 m to 0.1 m.

902 is an example of the display of the distance range indicator in the macro mode. The indicator 311 of the focus-capable range is displayed in a range of from 0.09 m to 0.15 m. Meanwhile, the AF-unable focus range 310 is displayed from 0.15 m to the telephoto end (the right end of the bar 305). In this case, focus is possible through both AF and MF in the focus range from 0.09 m to 0.15 m, but focus is possible through neither AF nor MF in the focus range from 0.15 m to infinity.

Figure 10:
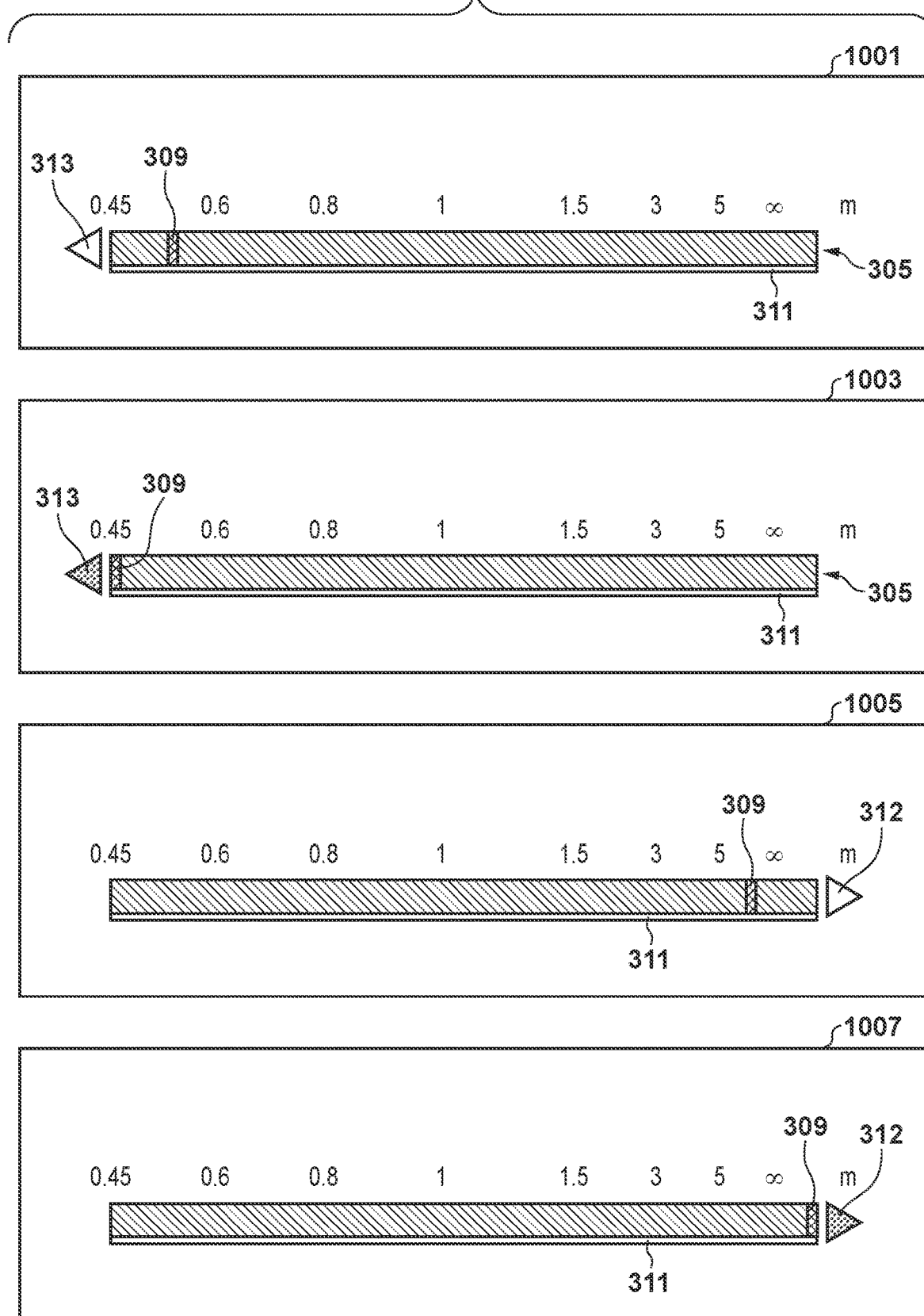
FIG. 10 is a diagram illustrating an example of the display of a distance range indicator when a lens unit is in a manual focus mode, according to the first embodiment.

FIG. 10 is an example of the display of the distance range indicator when the lens unit is in MF mode.

1001 is an example of the display of the distance range indicator when an MF operation for moving the focus distance toward the near end (an operation of rotating the focus ring 7) is detected. In the MF mode, even if there is an AF-unable focus range, that range is not displayed, and the MF-capable focus range (the focus range during MF) is indicated by the indicator 311 of the focus-capable range. The icon 313, which indicates that the focus distance is moving toward the near end, is displayed in white.

1003 is an example of the display of the distance range indicator when, in a state where the focus distance has moved to the near end, an MF operation for moving the focus distance further toward the near end has been detected. In this case, the color of the icon 313 is changed to gray in order to notify the user that the focus distance cannot be changed any more in that direction through MF operations. The focus distance indicator 309 is also displayed at the left end of the bar 305.

1005 is an example of the display of the distance range indicator when MF operation for moving the focus distance toward infinity is detected. The icon 312, which indicates that the focus distance is moving toward infinity, is displayed in white. By comparing the position of the focus distance indicator 309 with the position of infinity (∞), and operating the focus ring 7 to make fine adjustments so that the position of the focus distance indicator 309 moves and the distance between the focus distance indicator 309 and infinity (∞) is reduced, the user can set the focus distance to infinity.

1007 is an example of the display of the distance range indicator when, in a state where the focus distance has moved past the position of infinity and to the infinity end, an MF operation for moving the focus distance further toward infinity has been detected. In this case, the color of the icon 312 is changed to gray in order to notify the user that the focus distance cannot be changed any more in that direction through MF operations. The focus distance indicator 309 is also displayed at the right end of the bar 305.

Note that as described above, rather than changing the icons 312 and 313 to gray, the user may be notified through another display format, by supplying tactile feedback through the focus ring 7, or the like.

Although the present embodiment describes a case where the lens unit is a fixed focus lens, the basic operations are the same even when the lens unit is a zoom lens. However, in a zoom lens, the minimum distance at which shooting is possible (the closest distance) typically changes depending on the angle of view. Accordingly, multiple sets of the plurality of representative distances and display positions, included in the focus range in which shooting is possible (the focus range), are saved as the static lens information in accordance with different angles of view, and the current angle of view is included in the dynamic lens information. In step S604 or step S608 of FIG. 6, the system control unit 50 selects a set of numerical values corresponding to the current angle of view, and carries out the rendering. This makes it possible to provide information based on the current angle of view of the lens unit to the user.

As described thus far, according to the present embodiment, a user interface for assisting the focus adjustment operations by the user is displayed in accordance with the characteristics of the attached lens unit. Accordingly, a user interface with good usability, which takes into account the unique beyond infinity area of the lens unit, the focus range in which shooting is possible, and the like, can be provided, which makes it possible to assist the focusing operations of the user.

Second Embodiment

A second embodiment of the present invention will be described next. The second embodiment clearly presents the beyond infinity area in the bar 305 of the distance range indicator described in the first embodiment.

Figure 11:
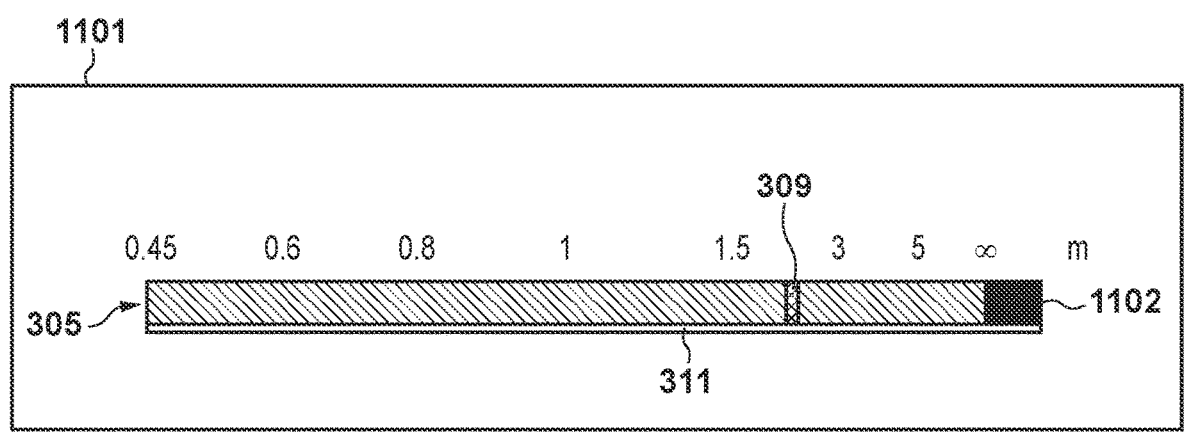
FIG. 11 is a diagram illustrating an example of the display of a distance range indicator according to a second embodiment.

FIG. 11 is a diagram illustrating an example of the display of the distance range indicator according to the present embodiment. The display format of a part of the bar 305, which corresponds to the focus range of an beyond infinity area 1102, is made different from the display format of a part corresponding to another focus range. Although FIG. 11 illustrates an example in which the part corresponding to the focus range of the beyond infinity area 1102 is indicated with a darker color (e.g., black) than other areas, another display format may be used instead.

Aside from the distance range indicator rendering process, the embodiment is the same as the first embodiment. Accordingly, the following will describe only the distance range indicator rendering process according to the present embodiment.

Figure 12:
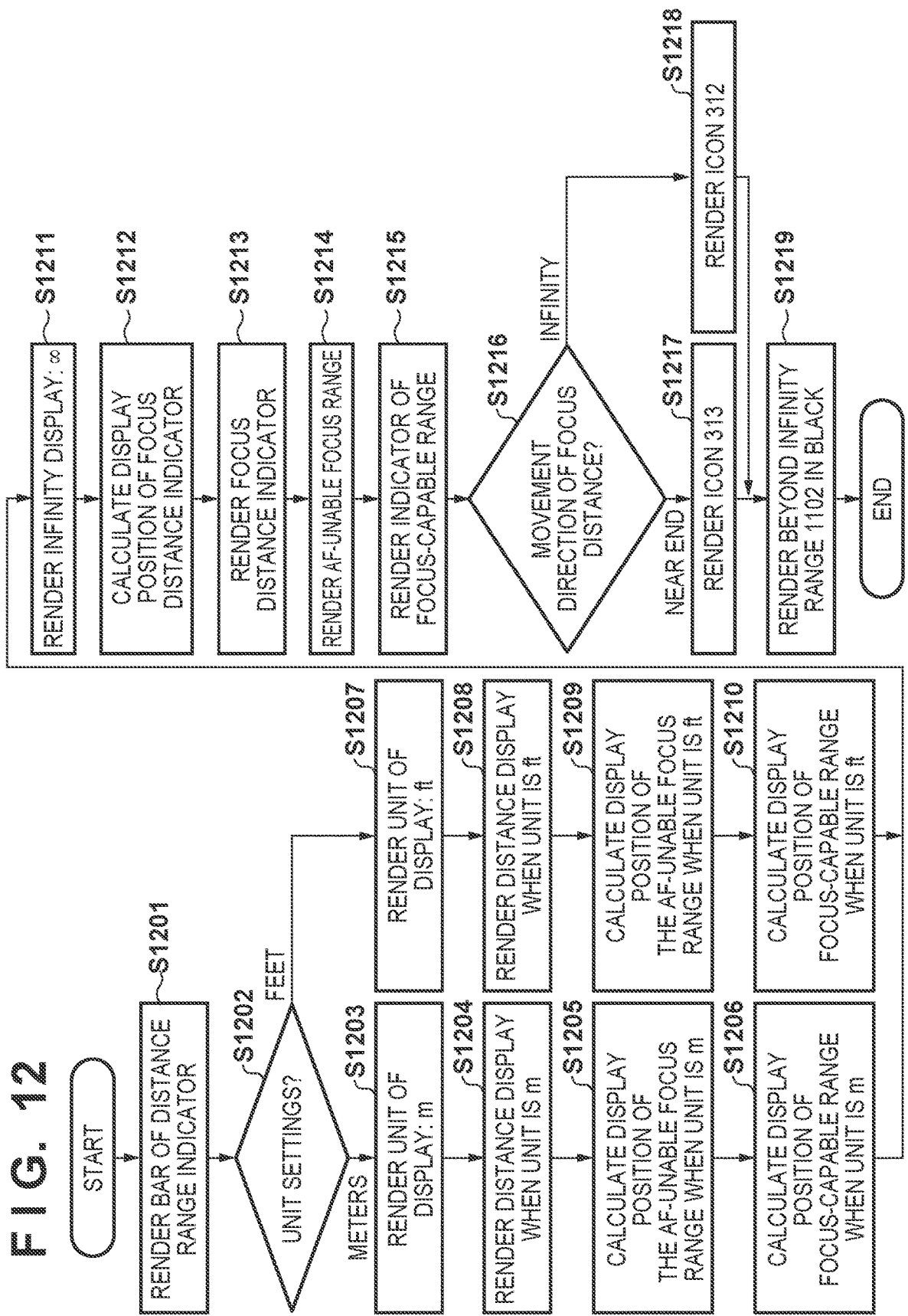
FIG. 12 is a flowchart relating to operations by the system control unit 50 according to the second embodiment.

FIG. 12 is a flowchart relating to the details of the distance range indicator rendering process according to the present embodiment. This processing is realized by the system control unit 50 loading a program recorded in the non-volatile memory 56 into the system memory 52 and executing the program.

The processing from steps S1201 to S1218 is the same as that from steps S601 to S618 in FIG. 6, and thus descriptions thereof will not be given.

In step S1219, the system control unit 50 renders the beyond infinity area 1102 with black within the bar 305 of the distance range indicator, and then ends the process. Note that the beyond infinity area 1102 can be determined on the basis of the ratio of the beyond infinity area with respect to the range of motion of the focus lens, or the display position of infinity included in the plurality of representative distances in the focus range, which have been obtained from the static lens information.

According to the present embodiment, in addition to the effects of the first embodiment, an effect can be achieved in which the range of an beyond infinity area unique to the attached lens unit can be confirmed even more easily.

Other Embodiments

The foregoing embodiments describe an example in which the distance range indicator is displayed superimposed on a live view image. However, the distance range indicator may be displayed along with another image, or alone, instead of being superimposed on the live view image.

Additionally, the foregoing embodiments describe a configuration for applying the invention in a camera system. However, the display of the distance range indicator according to the embodiments may be carried out in an electronic device capable of communicating with the camera system through the communication unit 54, e.g., an electronic device capable of remotely operating the camera system. In this case, the system control unit 50 sends display image data, for superimposing a UI over the live view image displayed in the display unit 28 as OSD, to the external device via the communication unit 54. The external device may then carry out the display on the basis of the image data received from the communication unit 54, or via another device, over a network, or the like.

Alternatively, the system control unit 50 may send data of the live view image, the static lens information, and the dynamic lens information to an external device via the communication unit 54. Then, on the basis of the data received from the communication unit 54, or via another device, over a network, or the like, the external device may execute the processing illustrated in step S403 of FIG. 4, FIG. 5A, FIG. 5B, and FIG. 6, and may generate and display an image for display.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-118193, filed on Jun. 21, 2018, which is hereby incorporated by reference herein in its entirety.

What is claimed is:

1. An electronic device comprising:
at least one processor and/or at least one circuit to perform the operations of the following units:
(1) an adjustment unit configured to adjust a focus distance of a lens unit, wherein the lens unit includes an operational device, and wherein the adjustment unit allows a user to manually adjust the focus distance of the lens unit by operating the operational device;
(2) a control unit configured to control a display device; and
(3) an obtainment unit configured to obtain, from the lens unit, (i) first information relating to a first range, the first range being a focus range of the lens unit, (ii) second information relating to a second range, the second range being a part of the focus range, wherein in the second range, automatic adjustment of the focus distance by the adjustment unit is limited, and (iii) third information relating to a third range, the third range being a part of the focus range, wherein in the third range, manual adjustment of the focus distance by operating the operational device is limited,
wherein the control unit controls, on the basis of the first information, the second information, and the third information, the display device so as to display the first range, the second range, and the third range to be distinguishable from each other in a same display screen.

2. The electronic device according to claim 1, wherein the first range is an overall focus range from a shortest focus distance of the lens unit to infinity.

3. The electronic device according to claim 1, wherein the second range is a focus range from a first focus distance of the lens unit to infinity, the first focus distance being longer than a shortest focus distance of the lens unit.

4. The electronic device according to claim 1, wherein the obtainment unit obtains the first information from the lens unit upon detecting that the lens unit has been connected.

5. The electronic device according to claim 1, wherein the lens unit further includes a limiting unit for limiting a range of the focus distance which can be adjusted by the adjustment unit.

6. The electronic device according to claim 1, wherein the at least one processor and/or at least one circuit further perform the operations of a limiting unit configured to limit a range of the focus distance which can be adjusted by the adjustment unit.

7. The electronic device according to claim 1, wherein the first information includes (a) information indicating a plurality of distances included in the focus range, and (b) information indicating respective display positions of the plurality of distances; and
wherein the control unit controls the display device so as to display indicator images, respectively indicating the plurality of distances, at the respective display positions associated with the plurality of distances.

8. The electronic device according to claim 7, wherein the control unit controls the display device so as to display the indicator images along with a live view image shot using the lens unit.

9. The electronic device according to claim 1, wherein the control unit controls the display device so as to display an image indicating the first range, an image indicating the second range, and an image indicating the third range in the same screen of the display device.

10. The electronic device according to claim 1, wherein the control unit controls the display device so as to:
display a rectangular image corresponding to the first range;
display a part of the rectangular image corresponding to the second range to be distinguishable from other parts; and
display an image corresponding to the third range so that the image is adjacent to the rectangular image.

11. The electronic device according to claim 1, wherein the lens unit can be attached to and removed from the electronic device.

12. The electronic device according to claim 1, wherein the control unit controls the display device so as to display the first range with a first color and the second range with a second color distinguished from the first color.

13. A method of controlling an electronic device that includes an adjustment unit configured to adjust a focus distance of a lens unit, wherein the lens unit includes an operational device, and wherein the adjustment unit allows a user to manually adjust the focus distance of the lens unit by operating the operational device, the method comprising:
obtaining, from the lens unit, (i) first information relating to a first range, the first range being a focus range of the lens unit, (ii) second information relating to a second range, the second range being a part of the focus range, wherein in the second range, automatic adjustment of the focus distance by the adjustment unit is limited, and (iii) third information relating to a third range, the third range being a part of the focus range, wherein in the third range, manual adjustment of the focus distance by operating the operational device is limited; and
controlling, on the basis of the first information, the second information, and the third information, a display device so as to display the first range, the second range, and the third range to be distinguishable from each other in a same display screen.

14. A non-transitory computer-readable medium that stores one or more programs including instructions executable by one or more processors in an electronic device, wherein the electronic device includes an adjustment unit configured to adjust a focus distance of a lens unit, wherein the lens unit includes an operational device, and wherein the adjustment unit allows a user to manually adjust the focus distance of the lens unit by operating the operational device, and wherein the instructions, when executed by the one or more processors, cause the electronic device to perform a method comprising:
obtaining, from the lens unit, (i) first information relating to a first range, the first range being a focus range of the lens unit, (ii) second information relating to a second range, the second range being a part of the focus range, wherein in the second range, automatic adjustment of the focus distance by the adjustment unit is limited, and (iii) third information relating to a third range, the third range being a part of the focus range, wherein in the third range, manual adjustment of the focus distance by operating the operational device is limited; and
controlling, on the basis of the first information, the second information, and the third information, a display device so as to display the first range, the second range, and the third range to be distinguishable from each other in a same display screen.

* * * * *